United States Patent
Yashiro et al.

(10) Patent No.: US 10,495,937 B2
(45) Date of Patent: Dec. 3, 2019

(54) ELECTROCHROMIC DEVICE AND PRODUCTION METHOD THEREOF

(71) Applicant: RICOH COMPANY, LTD., Tokyo (JP)

(72) Inventors: Tohru Yashiro, Kanagawa (JP); Keiichiroh Yutani, Kanagawa (JP); Sukchan Kim, Kanagawa (JP); Satoshi Yamamoto, Kanagawa (JP); Takahiko Matsumoto, Kanagawa (JP); Fuminari Kaneko, Kanagawa (JP); Hidekazu Yaginuma, Kanagawa (JP); Mamiko Inoue, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/526,590

(22) PCT Filed: Nov. 17, 2015

(86) PCT No.: PCT/JP2015/005741
§ 371 (c)(1),
(2) Date: May 12, 2017

(87) PCT Pub. No.: WO2016/079982
PCT Pub. Date: May 26, 2016

(65) Prior Publication Data
US 2017/0329197 A1   Nov. 16, 2017

(30) Foreign Application Priority Data

Nov. 19, 2014 (JP) ................................. 2014-234183
May 22, 2015 (JP) ................................. 2015-104328

(51) Int. Cl.
*G02F 1/1506* (2019.01)
*B29D 11/00* (2006.01)
(Continued)

(52) U.S. Cl.
CPC ........ *G02F 1/1506* (2013.01); *B29D 11/0073* (2013.01); *B29D 11/0074* (2013.01);
(Continued)

(58) Field of Classification Search
CPC ........ G02F 1/1506; G02F 1/1508; G02F 1/15; G02F 1/1521; G02F 1/1523;
(Continued)

(56) References Cited

U.S. PATENT DOCUMENTS 5,185,182 A * 2/1993 Brown ................. C03C 17/3423
427/126.2
5,667,663 A * 9/1997 Rickerby .............. C23C 14/083
148/277
(Continued)

FOREIGN PATENT DOCUMENTS

JP 07-168209 7/1995
JP 4105537 4/2008
(Continued)

OTHER PUBLICATIONS

International Search Report dated Jan. 19, 2016 for counterpart International Patent Application No. PCT/JP2015/005741 filed Nov. 17, 2015.
(Continued)

*Primary Examiner* — William R Alexander
(74) *Attorney, Agent, or Firm* — Oblon, McClelland, Maier & Neustadt, L.L.P.

(57) ABSTRACT

To provide an electrochromic device, including a laminated body, which includes: at least one support; a first electrode layer on the support; an electrochromic layer on the first electrode layer; a second electrode layer disposed to face the first electrode layer; and an electrolyte layer, which fills between the first electrode layer and the second electrode layer, and is on the electrochromic layer, the at least one
(Continued)

support including a resin substrate, and the laminated body having a desired curve formed by thermoforming.

20 Claims, 11 Drawing Sheets

(51) Int. Cl.
*G02F 1/15* (2019.01)
*G02F 1/153* (2006.01)
*G02F 1/161* (2006.01)
*G02C 7/10* (2006.01)
*B29C 51/00* (2006.01)
*E06B 3/67* (2006.01)
*G02F 1/157* (2006.01)
*G02F 1/29* (2006.01)

(52) U.S. Cl.
CPC ........ *B29D 11/00634* (2013.01); *G02C 7/101* (2013.01); *G02F 1/15* (2013.01); *G02F 1/1533* (2013.01); *G02F 1/161* (2013.01); *B29C 51/00* (2013.01); *B29D 11/00807* (2013.01); *E06B 3/6722* (2013.01); *G02F 1/157* (2013.01); *G02F 1/29* (2013.01); *G02F 2001/164* (2019.01); *G02F 2201/50* (2013.01); *G02F 2201/501* (2013.01)

(58) Field of Classification Search
CPC ........ G02F 1/1533; G02F 1/153; G02F 1/155; G02F 1/157; G02F 1/163; G02F 2001/1515; G02F 2001/1519; G02F 2001/1536; G02F 2001/164; G02F 1/161; G02F 1/29; G02F 2201/50; G02F 2201/501; G02C 7/101; G02C 7/102; G09G 3/34; G09G 3/38; C03C 4/00; C03C 4/04; C03C 4/06; C09K 9/02; C09K 2211/1048; G02B 27/0174; G02B 27/0176; G02B 27/0178; G02B 5/23; B29D 11/00807; B29D 11/00634; B29D 11/0073; B29D 11/0074; B29C 51/00; E06B 3/6722
USPC ........ 359/265, 267, 270, 275; 345/105, 106; 353/52, 53
See application file for complete search history.

(56) References Cited

U.S. PATENT DOCUMENTS

| 5,724,187 A * | 3/1998 | Varaprasad ............ B32B 17/06 359/265 |
| 5,805,367 A * | 9/1998 | Kanazawa ............ B60R 1/088 359/267 |
| 6,115,171 A * | 9/2000 | Minami ................ G02F 1/1533 359/237 |
| 7,004,592 B2 * | 2/2006 | Varaprasad ............ B32B 17/06 359/265 |
| 7,102,602 B2 * | 9/2006 | Kim ....................... G02C 7/101 345/32 |
| 7,705,959 B2 * | 4/2010 | Kim ....................... G02C 7/101 349/155 |
| 7,808,692 B2 * | 10/2010 | Karmhag ............... A42B 3/226 359/265 |
| 8,384,983 B2 | 2/2013 | Yashiro et al. |
| 8,531,754 B2 | 9/2013 | Fujimura et al. |
| 8,593,715 B2 | 11/2013 | Yashiro et al. |
| 8,687,262 B2 | 4/2014 | Yashiro et al. |
| 8,736,941 B2 | 5/2014 | Naijo et al. |
| 8,743,048 B2 | 6/2014 | Takahashi et al. |
| 8,902,151 B2 | 12/2014 | Yashiro et al. |
| 8,937,758 B2 | 1/2015 | Kim et al. |
| 9,091,895 B2 | 7/2015 | Bergh et al. |
| 9,857,656 B2 * | 1/2018 | Seo ........................ B60R 1/088 |
| 2005/0248824 A1 | 11/2005 | Fukazawa et al. |
| 2009/0231663 A1 | 9/2009 | Hirano et al. |
| 2009/0231664 A1 | 9/2009 | Shibuya et al. |
| 2009/0262411 A1 | 10/2009 | Karmhag et al. |
| 2012/0050838 A1 | 3/2012 | Hirano et al. |
| 2013/0250394 A1 | 9/2013 | Okada et al. |
| 2013/0258439 A1 | 10/2013 | Naijo et al. |
| 2014/0078569 A1 | 3/2014 | Takahashi et al. |
| 2014/0212705 A1 | 7/2014 | Horiuchi et al. |
| 2014/0268284 A1 | 9/2014 | Naijo et al. |
| 2015/0168796 A1 | 6/2015 | Yashiro et al. |
| 2015/0198857 A1 | 7/2015 | Yashiro et al. |
| 2015/0274761 A1 | 10/2015 | Sagisaka et al. |
| 2015/0279573 A1 | 10/2015 | Horiuchi et al. |
| 2015/0331295 A1 | 11/2015 | Takahashi et al. |
| 2016/0005375 A1 | 1/2016 | Naijo et al. |
| 2016/0266460 A1 * | 9/2016 | Kloeppner ............ G02F 1/1533 |
| 2017/0176833 A1 * | 6/2017 | Goto ..................... G02C 7/101 |
| 2017/0329199 A1 * | 11/2017 | Yashiro ................ G02F 1/1521 |
| 2018/0017835 A1 * | 1/2018 | Kim ....................... G02B 1/041 |

FOREIGN PATENT DOCUMENTS

| JP | 2009-545015 | 12/2009 |
| JP | 2014-021452 | 2/2014 |
| JP | 2014-112183 | 6/2014 |
| JP | 2015-132778 | 7/2015 |
| WO | WO2008/013500 A1 | 1/2008 |
| WO | WO2014/017656 A1 | 1/2014 |
| WO | WO2014/025900 A1 | 2/2014 |

OTHER PUBLICATIONS

Chemistry of Materials review 2011,23,397-415, Navigating the Color Palette of Solution-Processable Electrochrornic Polymers(Reynolds).
Macromolecules 1996,29,7629-7630(Reynolds).
Polymer journal, vol. 41, No. 7, Electrochromic Organic-Matallic Hybrid Polymers, pp. 511-520, 2009.
Japanese Office Action dated Apr. 16, 2019 in Japanese Application No. 2015-104328 with machine generated English translation.
Japanese Office Action dated Sep. 17, 2019 in Japanese Application No. 2015-104328.

* cited by examiner

[Fig. 1A]
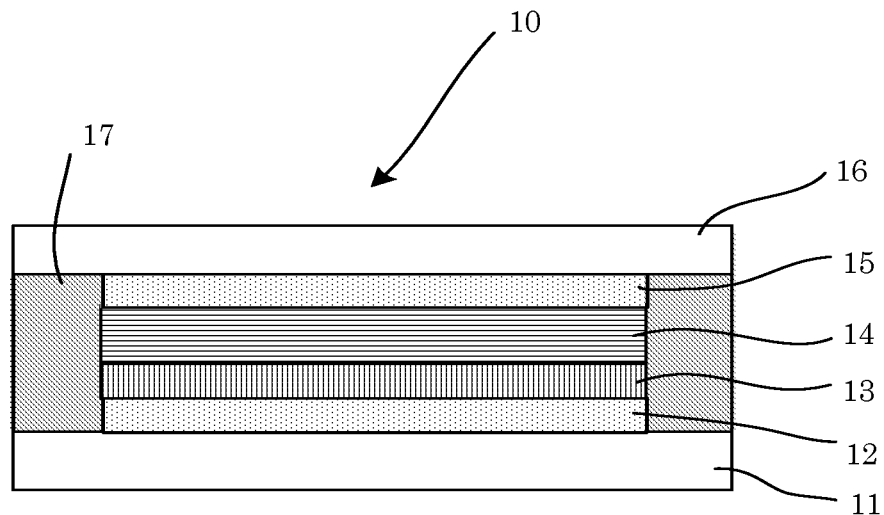
[Fig. 1B]
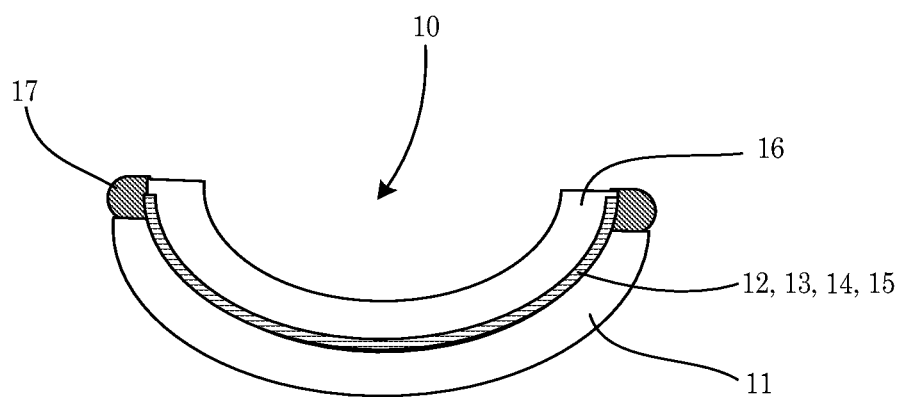

[Fig. 2A]
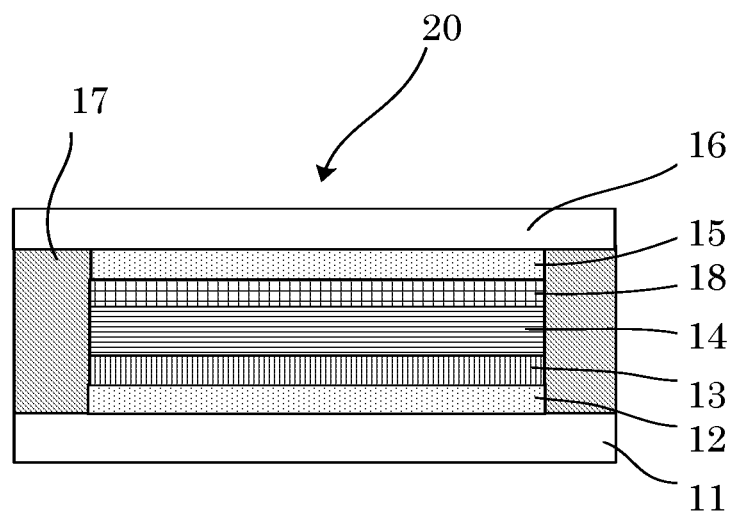
[Fig. 2B]
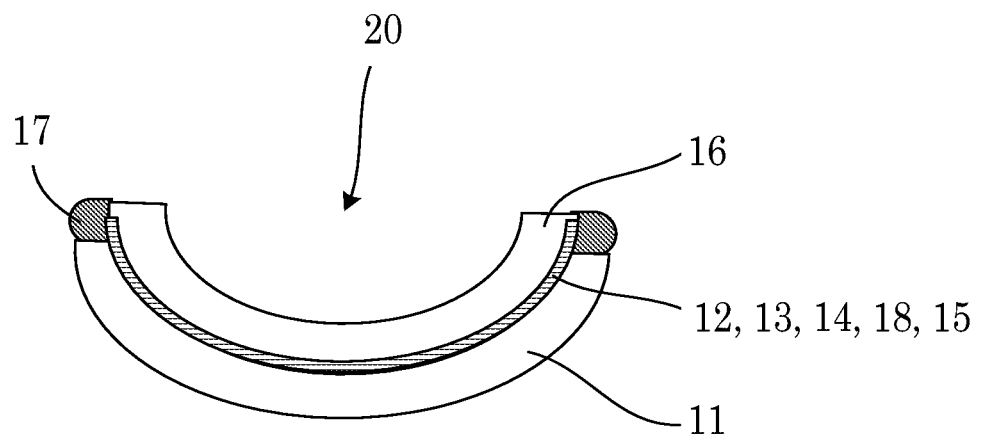

[Fig. 3A]
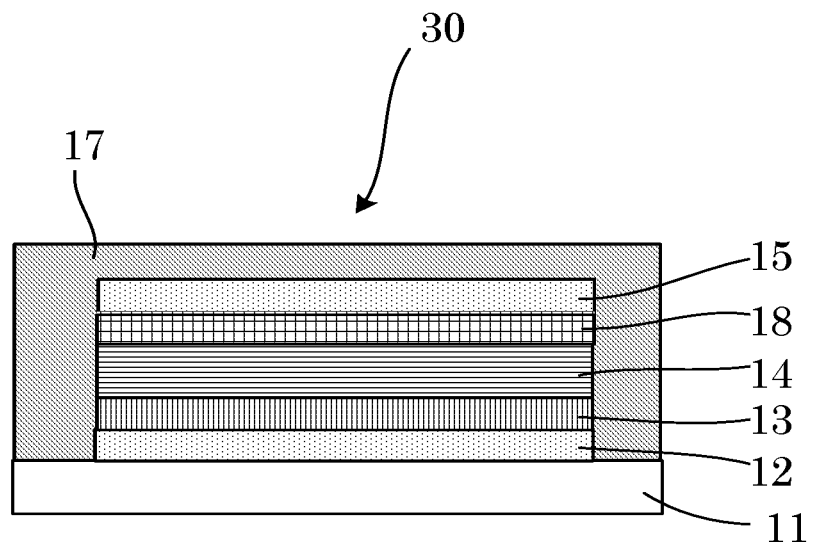
[Fig. 3B]
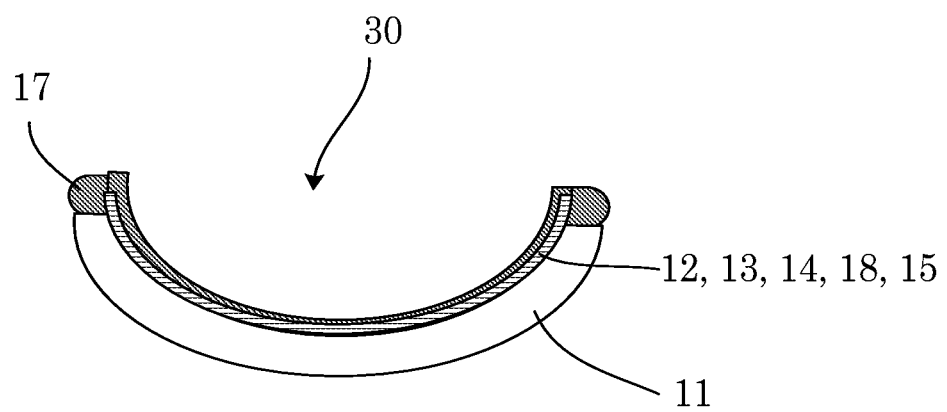

[Fig. 4A]
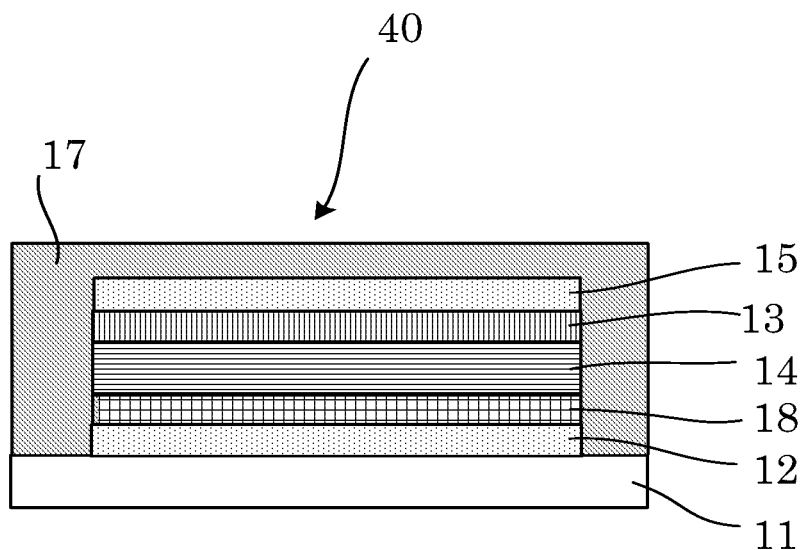
[Fig. 4B]
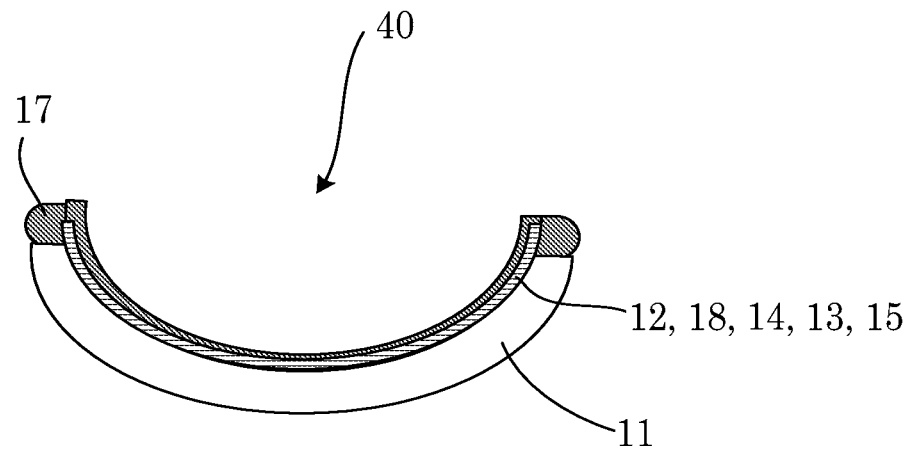

[Fig. 5]
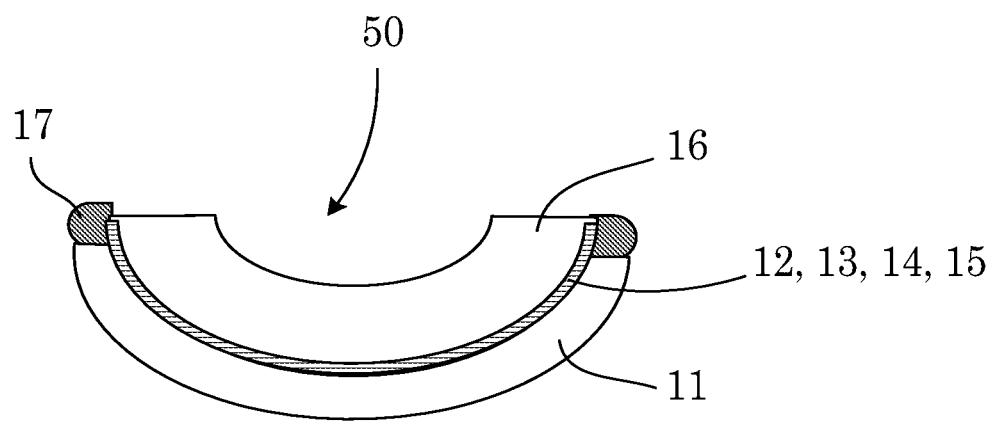
[Fig. 6]
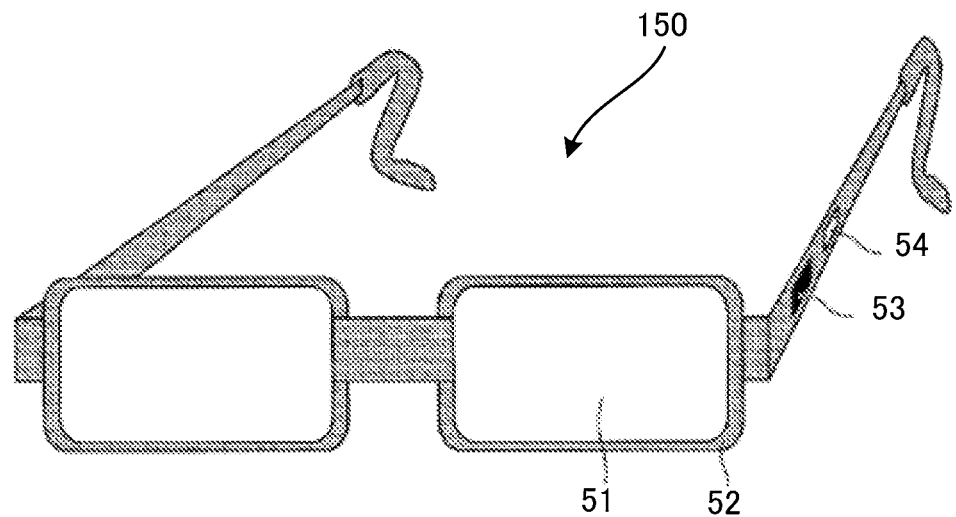

[Fig. 7A]
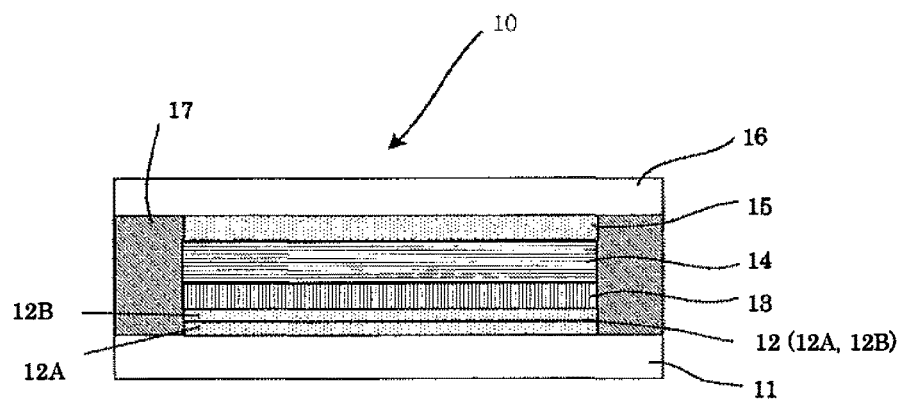
[Fig. 7B]
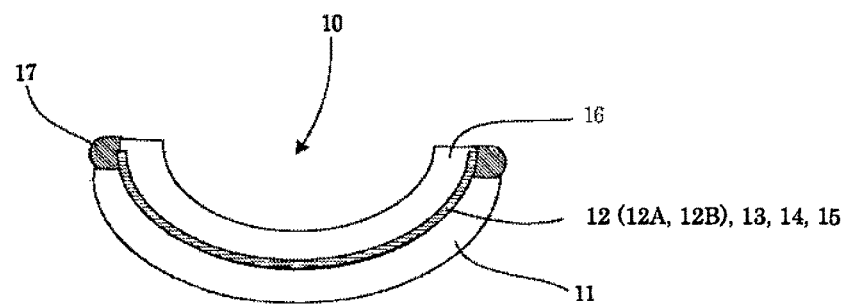

[Fig. 8A]
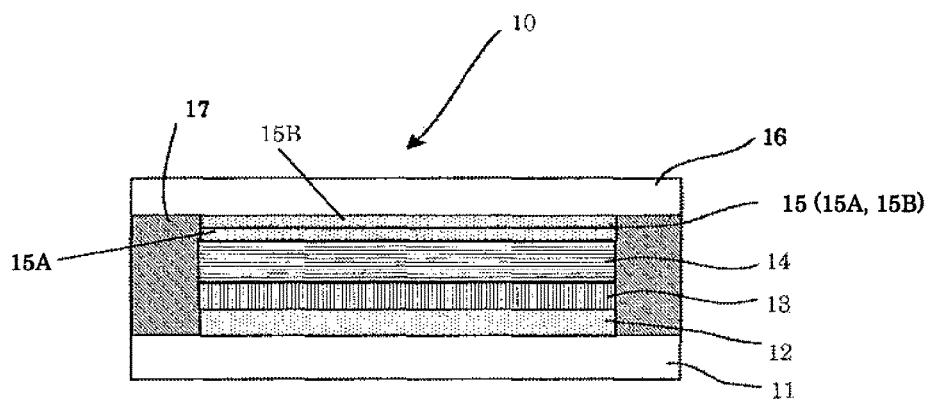
[Fig. 8B]
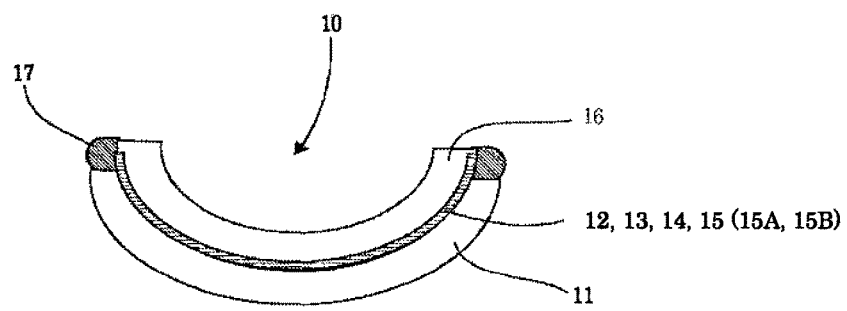

[Fig. 9A]
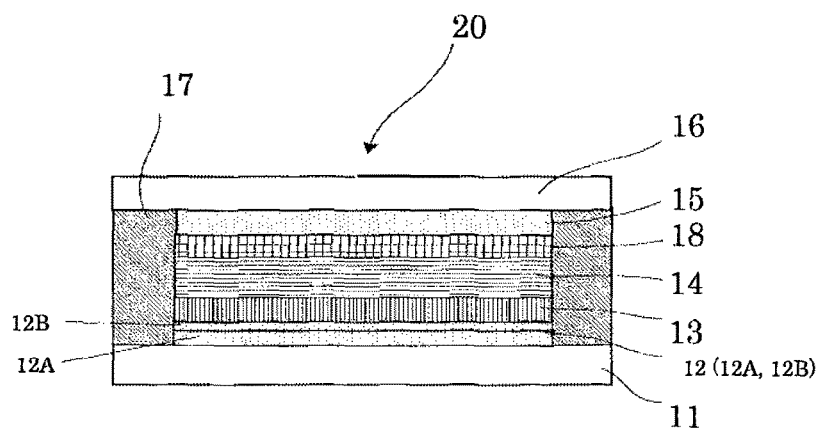
[Fig. 9B]
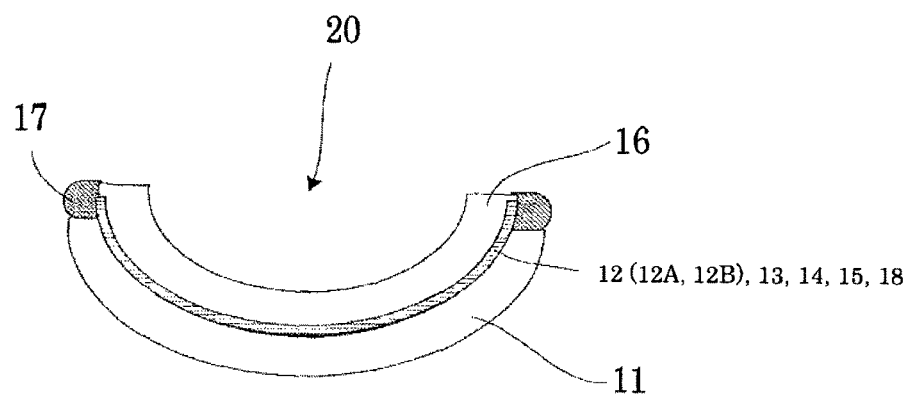

[Fig. 10A]
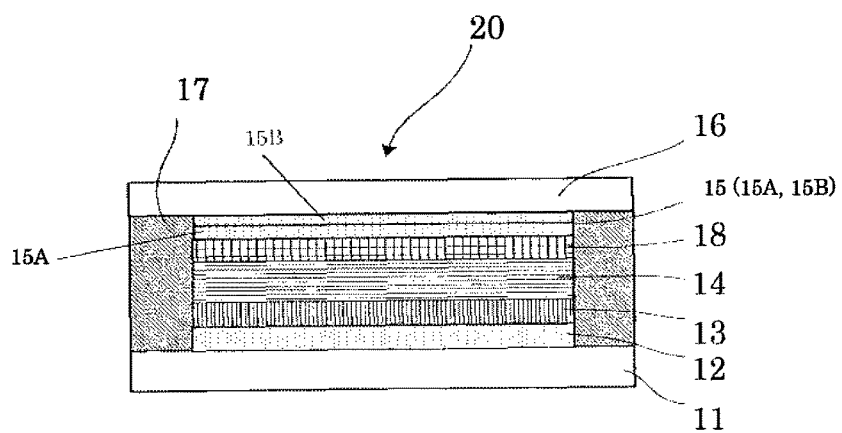
[Fig. 10B]
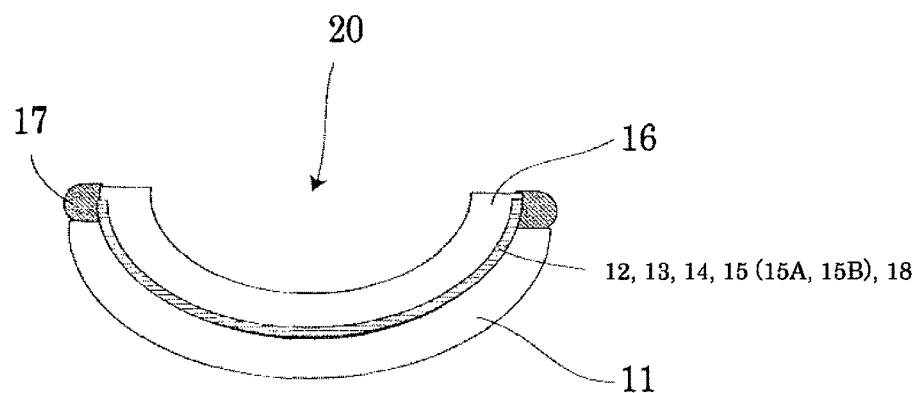

[Fig. 11A]
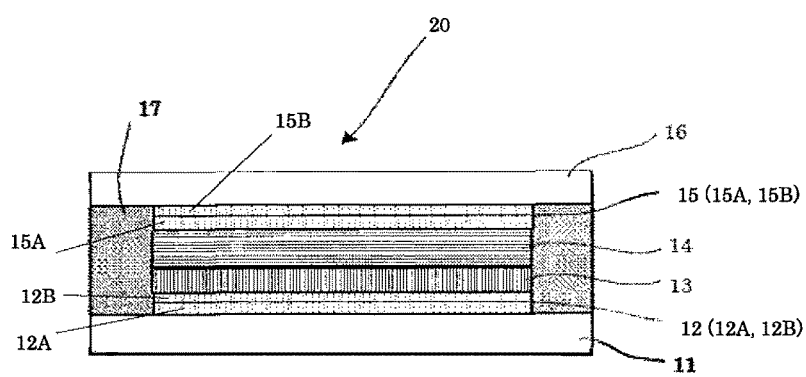
[Fig. 11B]
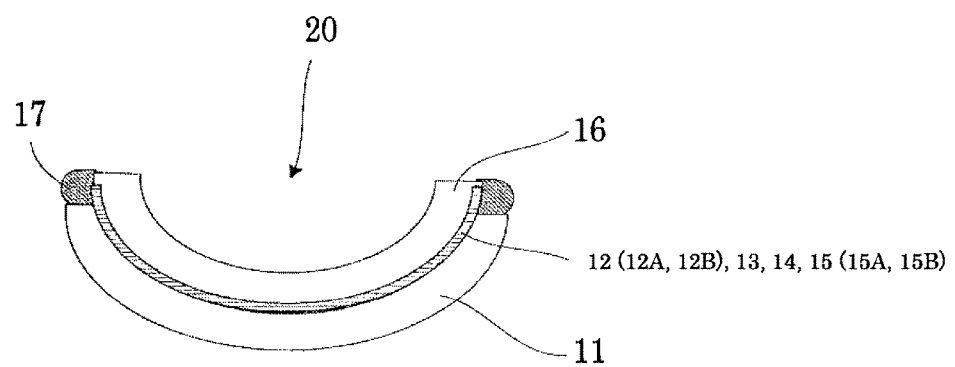

[Fig. 12A]
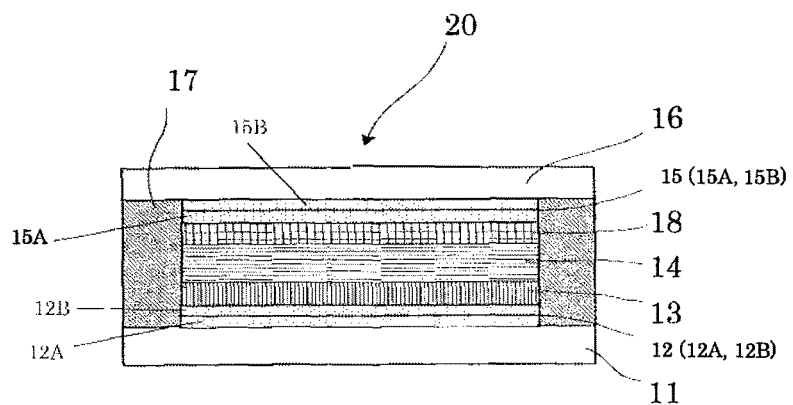
[Fig. 12B]
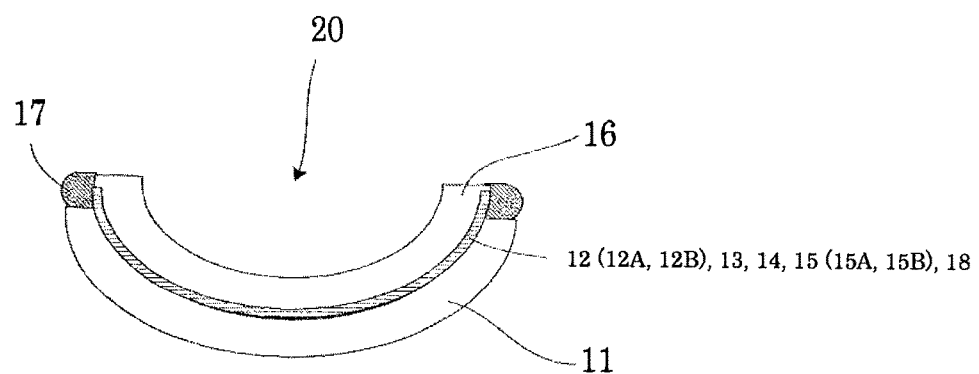

ELECTROCHROMIC DEVICE AND PRODUCTION METHOD THEREOF

TECHNICAL FIELD

The present invention relates to an electrochromic device, and a production method thereof.

BACKGROUND ART

Electrochromism is a phenomenon that oxidation and reduction reactions are reversely carried out to reversely change a color, as voltage is applied. A device utilizing this electrochromism is an electrochromic device. Various researches have been conducted on an electrochromic device to realize an application derived from characteristics of electrochromism.

As for electrochromic materials used for electrochromic devices, there are organic materials, and inorganic materials. The organic materials can be colored in various colors depending on the molecular structures thereof, and therefore the organic materials are promising materials to be used in color display devices. On the other hand, the inorganic materials have a problem in controlling a color. Using this characteristic, use of the inorganic materials for applications, in which a low color saturation is an advantage, such as a dimming glass, or a neutral density (ND) filter, has been considered.

The aforementioned electrochromic device typically has a structure where an electrochromic material is formed between two facing electrodes, and the space between the electrodes is filled with an electrolyte capable of ion conduction. In this structure, oxidation and reduction reactions are carried out. Electrochromism is an electrochemical phenomenon, hence a performance (ion conductivity) of the electrolyte layer affects a response speed or a memory effect of color. In the case where the electrolyte layer is a liquid state, in which an electrolyte is dissolved in a solvent, a quick response speed tends to be attained. However, an improvement thereof by solidification or gelation has been studied in view of strength of an element, and reliability. Specifically, an electrolytic solution has been conventionally used in a battery as an electrochemical element, or an electrochromic device. Therefore, the electrolytic solution is leaked, and the contents inside the battery are dried due to evaporation of the solvent. Inside the battery container, moreover, part of the barrier is dried due to deviation of the electrolytic solution. These factors may cause an increase in internal impedance, and internal short circuit.

Especially in the case where the electrochromic device is used as a dimming glass, or a display, at least one side of the electrochromic device needs to be sealed with a transparent material, such as a glass, or a plastic. Therefore, it is difficult to completely seal the electrolyte with a metal or the like, hence leak or evaporation of the electrolytic solution is a severe problem.

As for a method for solving the aforementioned problems, use of a solid polymer electrolyte is proposed. Examples of the solid polymer electrolyte include a solid solution of a matrix polymer containing an oxyethylene chain or an oxypropylene chain, and an inorganic salt. These solid solutions are complete solids, and they have excellent processability, but having a low electric conductivity. In order to improve electric conductivity of the solid polymer electrolyte, therefore, proposed are a method where an organic electrolytic solution is dissolved in a polymer to form into a semi-solid, and a method where a liquid monomer to which an electrolyte is added, and the liquid monomer is reacted through a polymerization reaction to thereby form a cross-linked polymer containing the electrolyte. However, these proposed methods have not yet reached the level of practical use.

Meanwhile, the electrochromic device is typically produced by forming an electrochromic material between two electrodes facing each other, followed by bonding via an electrolyte layer capable of ion conduction. Therefore, an application of a flat shape can be easily formed, but there is a problem that the electrochromic device cannot be easily applied for an application of a curved shape, or a three-dimensional (3D) shape. If the electrochromic device can be applied for a three-dimensional (3D) shape, such as a lens, a range of the applications thereof is widened as an optical use. However, there is a problem that an optical failure tends to occur due to precision of a curve or positioning precision of two substrate to be bonded. In case of spectacle lenses, the spectacle power of the lenses needs to be adjusted depending on a user, and therefore the necessity of preparing many substrates having different curves becomes a problem in mass-production.

In order to solve the aforementioned problems, there has been an attempt to produce an electrochromic device without a bonding process. In the conventional art, however, it is difficult to form the aforementioned electrochromic device on a support by a thin film forming process. In the case where an electrode layer is formed on an electrolyte layer in order to omit the bonding process, use of an all solid electrolyte causes the aforementioned problem that a response speed is slow. If an organic material layer is used as an all solid electrolyte layer, moreover, electric resistance of an electrode layer to be formed on an electrolyte layer tends to be high, and the electrochromic device cannot be regularly driven with oxidation reduction. Particularly when an oxide layer (e.g., ITO, IZO, $SnO_2$, AZO, and GZO) formed by vacuum film formation, which is typically adapted as a transparent electrode, is formed on a surface of an organic film, there is a problem that it is difficult to achieve transparency and electric conductivity at the same time.

In the case where an inorganic material layer is used as an all solid electrolyte layer, on the other hand, an electrochromic compound for use is limited to an inorganic electrochromic compound. Example of an electrochromic device using the inorganic electrochromic compound include an electrochromic device having a structure where a reduction coloring layer and an oxidation coloring layer are provided to face each other with a solid electrolyte layer being between them. Proposed is an electrochromic device, which has the reduction coloring layer composed of a material containing tungsten oxide and titanium oxide, the oxidation coloring layer composed of a material containing nickel oxide, and a transparent intermediate layer, which is disposed between the oxidation coloring layer, and a solid electrolyte layer, and contains metal oxide other than nickel oxide, or a metal, or a complex containing metal oxide other than nickel oxide and a metal as a main component (see, for example, PTL 1). This literature discloses that repetition properties and response are improved by forming the intermediate layer, hence coloring-discharging can be performed within a few seconds. However, the electrochromic device disclosed in PTL 1 has a complicated structure, and cannot be easily increased in its size, as multiple layers of the inorganic compound layer are formed by vacuum film formation, as well as increasing a cost. Moreover, it cannot avoid an influence from heat during the film formation process, and therefore the substrate for use is limited to a heat resistant material, such as glass. Furthermore, the inorganic electrochromic reaction is easily influenced by moisture, and a color tone of the inorganic electrochromic compound is limited to a tone of blue.

CITATION LIST

Patent Literature

[PTL 1]
Japanese Patent (JP-B) No. 4105537

SUMMARY OF INVENTION

Technical Problem

The present invention aims to provide an electrochromic device, which has a desired curve formed by thermoforming, and is suitably used for optical use, such as a lens.

Solution to Problem

The electrochromic device of the present invention, including: a laminated body, which include:
  at least one support;
  a first electrode layer on the at least one support;
  an electrochromic layer on the first electrode layer;
  a second electrode layer disposed to face the first electrode layer; and
  an electrolyte layer, which fills between the first electrode layer and the second electrode layer, and is on the electrochromic layer,
  the at least one support including a resin substrate, and the laminated body having a desired curve formed by thermoforming.

Advantageous Effects of Invention

The present invention can provide an electrochromic device, which has a desired curve formed by thermoforming, and is suitably used for optical use, such as a lens.

BRIEF DESCRIPTION OF DRAWINGS

FIG. 1A is a schematic cross-sectional view illustrating one example of the electrochromic device according to the first embodiment, before thermoforming.

FIG. 1B is a schematic cross-sectional view illustrating one example of the electrochromic device according to the first embodiment, after thermoforming.

FIG. 2A is a schematic cross-sectional view illustrating the electrochromic device according to the second embodiment, before thermoforming.

FIG. 2B is a schematic cross-sectional view illustrating the electrochromic device according to the second embodiment, after thermoforming.

FIG. 3A is a schematic cross-sectional view illustrating one example of the electrochromic device according to the third embodiment, before thermoforming.

FIG. 3B is a schematic cross-sectional view illustrating one example of the electrochromic device according to the third embodiment, after thermoforming.

FIG. 4A is a schematic cross-sectional view illustrating one example of the electrochromic device according to the fourth embodiment, before thermoforming.

FIG. 4B is a schematic cross-sectional view illustrating one example of the electrochromic device according to the fourth embodiment, after thermoforming.

FIG. 5 is a schematic cross-sectional view illustrating one example of the electrochromic device according to the fifth embodiment, after thermoforming.

FIG. 6 is a perspective view illustrating one example of the electrochromic dimming spectacles including the electrochromic dimming device of the present invention.

FIGS. 7A and 7B show respective schematic cross-sectional views illustrating one example of the electrochromic device according to another embodiment, before and after, respectively, thermoforming.

FIGS. 8A and 8B show respective schematic cross-sectional views illustrating one example of the electrochromic device according to another embodiment, before and after, respectively, thermoforming.

FIGS. 9A and 9B show respective schematic cross-sectional views illustrating one example of the electrochromic device according to another embodiment, before and after, respectively, thermoforming.

FIGS. 10A and 10B show respective schematic cross-sectional views illustrating one example of the electrochromic device according to another embodiment, before and after, respectively, thermoforming.

FIGS. 11A and 11B show respective schematic cross-sectional views illustrating one example of the electrochromic device according to another embodiment, before and after, respectively, thermoforming.

FIGS. 12A and 12B show respective schematic cross-sectional views illustrating one example of the electrochromic device according to another embodiment, before and after, respectively, thermoforming.

DESCRIPTION OF EMBODIMENTS (Electrochromic Device)

The electrochromic device of the present invention includes a laminated body, which includes at least one support, a first electrode layer on the at least one support, an electrochromic layer on the first electrode layer, a second electrode layer disposed to face the first electrode layer, an electrolyte layer, which fills between the first electrode layer and the second electrode layer, and is on the electrochromic layer, and optional other layers.

Examples of the aforementioned other layers include a protective layer, an antideterioration layer, and a release layer.

In the electrochromic device of the present invention, the laminated body has a desired curve formed by thermoforming. The phrase "desired curve" is a shape composed of a curved surface having a curvature, and examples thereof include a cylindrical shape, a conical shape, and various three-dimensional (3D) shapes. Note that, the "desired curve" can be provided at least part of the laminated body, or may be provided an entire part of the laminated body.

The electrochromic device contains at least one support, and the structure of the electrochromic device may include one support, or two supports.

In the electrochromic device, the support is composed of a resin substrate. As the laminated body, which is prepared by forming layers on a flat resin substrate, is formed into a desired curve by thermoforming, a large-size electrochromic device having excellent productivity of coating films can be provided.

In the electrochromic device, the first electrode layer, or the second electrode layer, or both the first electrode layer and the second electrode layer preferably contains/contain conductive metal, conductive oxide, conductive carbon, or any combination thereof. As a result of this, the electrode layers are rarely split even when the support is deformed at the time of thermoforming, and the resultant can be function as an electrochromic device. Moreover, the first electrode layer, or the second electrode layer, or both the first electrode layer and the second electrode layer preferably has/have a laminate structure including a layer containing conductive metal or conductive carbon, and a conductive oxide layer. As a result, an electrochromic reaction (coloring and discharging) can be uniformly performed over the plane of the electrochromic device.

Moreover, it is preferred that an antideterioration layer, which carries out a reverse electrochemical reaction to an oxidation or reduction reaction of the electrochromic layer, be in contact with the second electrode layer. The antideterioration layer prevents the second electrode layer from being deteriorated by an electrochemical reaction. It is particularly preferred that an antideterioration layer, which causes a reverse electrochemical reaction to an oxidation or reduction reaction of the electrochromic layer, be formed, as driving voltage can be reduced.

In order to prevent the electrode layers from being split, it is preferred that the laminated body be shaped so that the maximum length of the major length of the support of the curve of the laminated body after the thermoforming is 120% or less relative to the maximum length of the major length of the support on the flat surface of the laminated body before the thermoforming. In the case where transparent conductive oxide (e.g., ITO, IZO, $SnO_2$, AZO, and GZO) formed by vacuum deposition is used as the electrode layers, the ratio thereof is preferably 103% or less.

As for the thermoforming, a method where the laminated body is pressed and thermoformed with a convex mold and concave mold having desired curve (e.g., a three-dimensional (3D) shape) without fixing an edge of the support, is used. Moreover, the thermoforming may be combined with vacuum forming. In the case where transparent conductive oxide is formed by vacuum deposition, the lower the crystallinity of the electrode layers is the better. The reason thereof is because the electrode layers tend to split if the crystallinity of the electrode layers is high. To this end, IZO or AZO, which exhibits high conductivity with an amorphous film, is preferable as the electrode layers.

The electrolyte layer is a solid electrolyte layer, preferably a solid electrolyte layer, in which inorganic particles are mixed. Use of the inorganic particles in the solid electrolyte layer can reduce variations in the thickness and in-plane distribution of the electrolyte layer by the thermoforming. Moreover, leakage of the solid electrolyte layer can be prevented at the time of the thermoforming. Note that, the inorganic particles may be mixed in the electrochromic layer.

The material of the solid electrolyte layer is preferably a solid solution of a matrix polymer containing an oxyalkylene chain (e.g., an oxyethylene chain, and an oxypropylene chain) and an ionic liquid. Use of the aforementioned material can form a homogeneous solid electrolyte layer, leading to excellent oxidation reduction reactions.

(Method for Producing Electrochromic Device)

The method for producing an electrochromic device of the present invention contains at least thermoforming a produced laminated body to have a desired curve, and may further contain other steps, if necessary.

The method for producing an electrochromic device of a first embodiment preferably include: forming a first electrode layer on a first support and forming an electrochromic layer on the first electrode layer to thereby produce a first member; forming the second electrode layer on a second support to thereby produce a second member; and bonding the first member and the second member together with the electrolyte layer being between the first member and the second member, to thereby form the laminated body.

In the second embodiment, the method for producing an electrochromic device preferably contains: forming a first electrode layer on a support; forming an electrochromic layer on the first electrode layer; forming a solid electrolyte layer on the electrochromic layer; forming a second electrode layer on the solid electrolyte layer; and forming a protective layer on the second electrode layer to form a laminated body.

In the second embodiment, thermoforming is performed after forming all the layers on the support without the bonding process, and therefore productivity thereof can be improved.

As for the thermoforming, a method where the laminated body is pressed and thermoformed with a convex mold and concave mold having desired curve (e.g., a three-dimensional (3D) shape) without fixing an edge of the support, is preferable.

The heating temperature at the thermoforming is preferably around a softening point of a material constituting the support. In the case where a polycarbonate resin is used as the support, for example, the heating temperature is preferably 130° C. to 190° C.

In the method for producing an electrochromic device, it is preferred that the desired curve be formed by forming a resin layer on the outer surface of the support to thicken the support, and cutting the support thickened. When the thickness of the support is too thick, it is difficult to perform thermoforming. When the thickness of the support is too thin, it is difficult to perform additional processing on the support.

As the desired curve can be formed by cutting the support thickened, lens processing (e.g., power adjustment) according to the conditions unique to a user can be realized. Specifically, it is not necessary to prepare molds or members depending on a shape of a product, and thus small production of various types of products can be performed easily.

Embodiments for carrying out the intention are explained with reference to drawings. Note that, in each drawing, the same numeral reference is provided to the same constitutional part, and duplicated explanations may be omitted.

<Electrochromic Device of First Embodiment and Production Method Thereof>

FIGS. 1A and 1B are schematic cross-sectional views illustrating one example of the electrochromic device 10 according to the first embodiment. FIG. 1A illustrates the state before thermoforming, and FIG. 1B illustrates the state after thermoforming. With reference to FIGS. 1A and 1B, the electrochromic device 10 includes: a first support 11; a first electrode layer 12, an electrochromic layer 13, and a second support 16, which are sequentially laminated on the first support 11; a second electrode layer 15 laminated on the second support 16; an electrolyte layer 14 formed between the electrodes facing to each other; and a protective layer 17 sealing the periphery of the electrochromic device 10.

In the electrochromic device 10, the first electrode layer 12 is disposed on the first support 11, and the electrochromic layer 13 is disposed to be in contact with the first electrode layer 12. On the electrochromic layer 13, the second electrode layer 15 is disposed to face the first electrode layer 12 via the electrolyte layer 14.

For convenience, surfaces of the first electrode layer 12 and the second electrode layer 15 facing each other are referred as inner surfaces thereof, and surfaces thereof at the opposite sides of the inner surfaces are referred as outer surfaces thereof. In the present embodiment, the inner surface of the first electrode layer 12 is in contact with the electrochromic layer 13, and the outer surface of the first electrode layer 12 is in contact with the first support 11. Moreover, the inner surface of the second electrode layer 15 is in contact with the electrolyte layer 14, and the outer surface of the second electrode layer 15 is in contact with the second support 16. In FIGS. 1A and 1B, 17 denotes a protective layer.

The method for producing the electrochromic device 10 of the first embodiment contains: sequentially laminating a first electrode layer 12 and an electrochromic layer 13 on a first support 11; forming a second electrode layer 15 on a second support 16; forming an electrolyte layer 14 between the two supports, followed by curing, and sealing the periphery thereof with a protective layer 17; and thermoforming a laminated body to have a desired curve, and may further contain other steps, if necessary.

Moreover, the method for producing the electrochromic device 10 of the first embodiment contains: sequentially laminating a first electrode layer 12 and an electrochromic layer 13 on a first support 11; forming an electrolyte layer 14 on the electrochromic layer 13 followed by curing, and laminating a second electrode layer 15 thereon; forming a second support 16 formed of a cured resin on the second electrode layer 15; sealing the periphery with a protective layer 17; and thermoforming the laminated body to have a desired curve, and may further contain other steps, if necessary.

Note that, the figure where the electrochromic layer 13 side of the support is processed to give a convex spherical surface is illustrated in FIG. 1B, but the support can be similarly processed to give a concave spherical surface.

The electrolyte layer 14 is a solid electrolyte, preferably a solid electrolyte layer, in which inorganic particles are mixed. Use of the inorganic particles in the solid electrolyte layer can reduce variations in the thickness and in-plane distribution of the electrolyte layer by the thermoforming. Moreover, leakage of the solid electrolyte layer can be prevented at the time of the thermoforming.

The material of the solid electrolyte layer preferably contains a solid solution of a matrix polymer containing an oxyalkylene chain (e.g., an oxyethylene chain, and an oxypropylene chain) and an ionic liquid. Use of the aforementioned material can form a homogeneous solid electrolyte layer, leading to excellent oxidation reduction reactions. Note that, the inorganic particles may be mixed in the electrochromic layer.

In the electrochromic device 10, the electrochromic layer 13 gives out and receives electrical charges, as voltage is applied between the first electrode layer 12 and the second electrode layer 15. As a result, oxidation reduction reactions are caused to color and discharge the electrochromic device 10.

As described above, a curved surface in the desired curve (e.g., three-dimensional (3D) shape) can be formed on the electrochromic device of the first embodiment by thermoforming. Therefore, an electrochromic device having excellent productivity (large-size) can be provided.

The details of each constitutional element of the electrochromic device 10 of the first embodiment are explained hereinafter.

<Support>

The first support 11 and second support 16 each have a function of supporting the first electrode layer 12, the electrochromic layer 13, the electrolyte layer 14, the second electrode layer 15, and the protective layer 17.

As for the first support 11 and second support 16, conventional resin materials that can be subjected to thermoforming can be used as they are, as long as they can support the aforementioned layers.

As for the first support 11 and second support 16, for example, resin substrates, such as a polycarbonate resin, an acrylic resin, a polyethylene resin, a polyvinyl chloride resin, a polyester resin, an epoxy resin, a melamine resin, a phenol resin, a polyurethane resin, and a polyimide resin, may be used.

In the case where the electrochromic device 10 is a reflective display device, which is viewed from the side of the second electrode layer 15, either the first support 11 or the second support 16 does not require transparency. Moreover, a transparent insulating layer, or an anti-reflection layer may be coated on surfaces of the first support 11 and the second support 16 in order to enhance moisture-barrier properties, gas-barrier properties, and visibility.

The thickness of each of the first support 11 and the second support 16 is preferably 0.2 mm to 1.0 mm, as thermoforming can be performed easily.

<First Electrode Layer and Second Electrode Layer>

As for materials of the first electrode layer 12 and the second electrode layer 15, a transparent conductive oxide material is preferable. Examples thereof include tin-doped indium oxide (referred as "ITO" hereinafter), fluorine-doped tin oxide (referred as "FTO" hereinafter), and antimony-doped tin oxide (referred as "ATO" hereinafter). Among them, preferred is an inorganic material containing at least one selected from the group consisting of indium oxide (referred as "In oxide" hereinafter), tin oxide (referred as "Sn oxide" hereinafter), and zinc oxide (referred as "Zn oxide"), all of which are formed by vacuum film formation.

The In oxide, Sn oxide, and Zn oxide are materials that can be easily formed into a film by sputtering, and also are materials that can attain both excellent transparency and electric conductivity. Among them, InSnO, GaZnO, SnO, $In_2O_3$, ZnO, and InZnO are particularly preferable. Moreover, the lower the crystallinity of the electrode layers is the better. The reason thereof is because the electrode layers tend to split if the crystallinity of the electrode layers is high. To this end, IZO or AZO, which exhibits high conductivity with an amorphous film, is preferable as the electrode layers. In the aforementioned electrode layer material is used, it is preferred that the laminated body be shaped so that the maximum length of the major length of the support of the curve of the laminated body after the thermoforming is 120% or less, more preferably 103% or less, relative to the maximum length of the major length of the support on the flat surface of the laminated body before the thermoforming.

Moreover, a transparent conductive metal thin film including silver, gold, copper, aluminium, a carbon film (e.g., carbon nanotube, and graphene), a network electrode (e.g., conductive metal, conductive carbon, and conductive oxide), and a composite layer thereof is effective. The network electrode is an electrode, in which carbon nanotubes, or another high conductive non-transparent material is formed into a fine network to give a transmittance. The network electrode is preferable, as it is not easily split at the time of thermoforming.

Moreover, the electrode layer (12,15) preferably has a laminate structure of a network electrode and conductive oxide, or a laminate structure of a conductive metal layer or conductive carbon layer (12A, 15A) and a conductive oxide layer (12B, 15B), e.g., in the embodiments shown in FIGS. 7A-7B, 8A-8B, 9A-9B, 10A-10B, 11A-11B, and 12A-12B. The electrochromic layer can be evenly colored or discharged due to the aforementioned laminate structure of the electrode layer. Note that, the conductive oxide layer may be formed by coating a nanoparticle ink. Specifically, the laminate structure of the conductive metal layer and the conductive oxide layer is an electrode, which achieves both conductivity and transparency with a thin film laminate structure, such as ITO/Ag/ITO.

The thickness of each of the first electrode layer 12 and the second electrode layer 15 is adjusted to attain the electric resistance value required for oxidization and reduction reactions of the electrochromic layer 13.

In the case where ITO films formed by vacuum deposition are used as materials of the first electrode layer 12 and the second electrode layer 15, the thickness of each of the first electrode layer 12 and the second electrode layer 15 is preferably 20 nm to 500 nm, more preferably 50 nm to 200 nm.

In the case where the conductive oxide layer is formed by coating a nanoparticle ink, the thickness thereof is preferably 0.2 μm to 5 μm. In case of the network electrode, moreover, the thickness thereof is preferably 0.2 μm to 5 μm.

In the case where the electrochromic device is used as a dimming mirror, moreover, either the first electrode layer 12 or the second electrode layer 15 may have a structure having a reflection function. In this case, a metal material can be contained as a material of the first electrode layer 12 or the second electrode layer 15. Examples of the metal material include Pt, Ag, Au, Cr, rhodium, Al, an alloy thereof, and a laminate structure thereof.

Examples of the production method of each of the first electrode layer 12 and the second electrode layer 15 include vacuum vapor deposition, sputtering, and ion plating. In the case where a material of each of the first electrode layer 12 and the second electrode layer 15 can be applied by coating to form a film, moreover, examples of the production method thereof include spin coating, casting, microgravure coating, gravure coating, bar coating, roller coating, wire-bar coating, dip coating, slit coating, capillary coating, spray coating, nozzle coating, and various printing methods, such as gravure printing, screen printing, flexographic printing, offset printing, reverse printing, and inkjet printing.

<Electrochromic Layer>

The electrochromic layer 13 is a layer containing an electrochromic material.

The electrochromic material may be an inorganic electrochromic compound, or an organic electrochromic compound. Moreover, a conductive polymer that is known to exhibit electrochromism may be used as the electrochromic material.

Examples of the inorganic electrochromic compound include tungsten oxide, molybdenum oxide, iridium oxide, and titanium oxide.

Examples of the organic electrochromic compound include viologen, rear-earth phthalocyanine, and styryl.

Examples of the conductive polymer include polypyrrole, polythiophene, polyaniline, and derivatives thereof.

The electrochromic layer 13 preferably has a structure where an organic electrochromic compound is born on conductive or semiconductive particles. Specifically, it is a structure where particles having particle diameters of about 5 nm to about 50 nm are bonded on a surface of the electrode, and an organic electrochromic compound having a polar group, such as phosphonic acid, a carboxyl group, and a silanol group is adsorbed on surfaces of the particles.

In accordance with this structure, electrons are efficiently injected into the organic electrochromic compound utilizing an effect of a large surface area of the particles. Therefore, the electrochromic device containing the electrochromic layer of the aforementioned structure can achieve high speed response compared to a conventional electrochromic display element. Moreover, a transparent film can be formed as a display layer using the particles, and thus high coloring density of the electrochromic compound can be attained. Moreover, a plurality of the organic electrochromic compounds may be born on the conductive or semiconductive particles. Furthermore, the conductive particles can also exhibit conductivity as an electrode layer.

Specific examples of the polymer-based and dye-based electrochromic compound include: a low molecular organic electrochromic compound, such as an azo benzene-based electrochromic compound, an anthraquinone-based electrochromic compound, a diaryl ethane-based electrochromic compound, a dihydroprene-based electrochromic compound, a dipyridine-based electrochromic compound, a styryl-based electrochromic compound, a styryl spiropyran-based electrochromic compound, a spiro oxazine-based electrochromic compound, a spirothiopyran-based electrochromic compound, a thioindigo-based electrochromic compound, a tetrathiafulvalene-based electrochromic compound, a terephthalic acid-based electrochromic compound, a triphenylmethane-based electrochromic compound, a triphenylamine-based electrochromic compound, a naphthopyran-based electrochromic compound, a viologen-based electrochromic compound, a pyrazoline-based electrochromic compound, a phenazine-based electrochromic compound, a phenylenediamine-based electrochromic compound, a phenoxazine-based compound, a phenothiazine-based electrochromic compound, a phthalocyanine-based electrochromic compound, a fluoran-based electrochromic compound, a fulgide-based electrochromic compound, a benzopyran-based electrochromic compound, and a metallocene-based electrochromic compound; and a conductive polymer compound, such as polyaniline, and polythiophene. These may be used alone, or in combination.

Among them, a viologen-based compound, and a dipyridine-based compound are preferable, as they have low coloring-discharging electric potential, and exhibit an excellent color value. For example, a dipyridine-based compound represented by the following general formula (1) is more preferable.

(Chem. 1)

<General Formula (1)>

In the general formula (1), R1 and R2 are each independently a C1-C8 alkyl group that may have a substituent, or an aryl group, and at least one of R1 and R2 contains a substituent selected from COOH, $PO(OH)_2$, and $Si(OC_kH_{2K+1})_3$ (with proviso that k is 1 to 20).

In the general formula (1), X is a monovalent anion. The monovalent anion is appropriately selected depending on the intended purpose without any limitation, provided that it stably forms a pair with a cation site. Examples of the monovalent anion include Br ion (Br$^-$), Cl ion (Cl$^-$), ClO$_4$ ion (ClO$_4^-$), PF$_6$ ion (PF$_6^-$), and BF$_4$ ion (BF$_4^-$).

In the general formula (1), n, m, and 1 are each 0, 1, or 2.

In the general formula (1), A, B, and C are each independently a C1-C20 alkyl group that may have a substituent, an aryl group, and a heterocyclic group.

As for a metal complex-based, or metal oxide-based electrochromic compound, for example, usable is an inorganic electrochromic compound, such as titanium oxide, vanadium oxide, tungsten oxide, indium oxide, iridium oxide, nickel oxide, and Prussian blue.

The conductive or semiconductive particles bearing the electrochromic compound are appropriately selected depending on the intended purpose without any limitation, but metal oxide is preferably used as the particles.

Examples of a material of the metal oxide include metal oxide containing, as a main component, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide nickel oxide, cobalt oxide, barium oxide, strontium oxide, vanadium oxide, aminosilicate, calcium phosphate, or aluminosilicate. These may be used alone, or in combination.

Among them, at least one selected from the group consisting of titanium oxide, zinc oxide, tin oxide, zirconium oxide, iron oxide, magnesium oxide, indium oxide, and tungsten oxide is preferable in view of electrical properties, such as electric conduction, and physical properties such as optical characteristics. Particularly preferred is titanium oxide or tin oxide, as a color display having excellent a response speed of a color is enabled.

Moreover, shapes of the conductive or semiconductive particles are appropriately selected depending on the intended purpose without any limitation, but the shapes having a large surface area per unit volume (may be referred as "specific surface area" hereinafter) are used in order to efficiently bear the electrochromic compound thereon. In the case where the particles are an aggregate of nano particles, for example, the electrochromic compound is more efficiently born thereon, as it has a large specific surface area, to provide an excellent display contrast ratio of coloring and discharging.

The electrochromic layer 13 and the conductive or semiconductive particle layer can be formed by vacuum film formation, but they are each preferably formed by applying a particle dispersion paste in view of productivity.

The thickness of the electrochromic layer 13 is appropriately selected depending on the intended purpose without any limitation, but the thickness thereof is preferably 0.2 μm to 5.0 μm. When the thickness thereof is less than 0.2 μm, a desired coloring density may not be attained. When the thickness thereof is greater than 5.0 μm, visibility may be lowered by tinting, as well as increasing a production cost.

<Electrolyte Layer>

The electrolyte layer 14 is a solid electrolyte layer, and is formed as a film including an electrolyte in a photocurable or heat curable resin. Moreover, the electrolyte layer preferably contains therein inorganic particles for controlling the layer thickness thereof.

The electrolyte layer is preferably a film formed by applying a solution, in which inorganic particles, a curable resin, and an electrolyte are mixed, onto the electrochromic layer 13, followed by curing with light or heat. The electrolyte layer may be a film, which is formed by forming a porous inorganic particle layer, and applying a solution prepared by mixing a curable resin and an electrolyte in a manner that the solution permeates the inorganic particle layer, followed by curing with light or heat. In the case where the electrochromic layer 13 is a layer, in which the electrochromic compound is born on the conductive or semiconductive nano particles, moreover, the electrolyte layer may be a film formed by applying a solution prepared by mixing a curable resin and an electrolyte onto the electrochromic layer in a manner that the solution permeates the electrochromic layer, followed by curing with light or heat.

As for the electrolyte, a liquid electrolyte (e.g., an ionic liquid) or a solution prepared by dissolving a solid electrolyte in a solvent is used.

As for a material of the electrolyte, for example, an inorganic salt (e.g., alkali metal salt, and alkaline earth metal salt), quaternary ammonium salt, or supporting electrolyte of acid or alkali can be used. Specific examples thereof include LiClO$_4$, LiBF$_4$, LiAsF$_6$, LiPF$_6$, LiCF$_3$SO$_3$, LiCF$_3$COO, KCl, NaClO$_3$, NaCl, NaBF$_4$, NaSCN, KBF$_4$, Mg(ClO$_4$)$_2$, and Mg(BF$_4$)$_2$.

The ionic liquid is not particularly limited, and may be any of materials that have been typically researched and reported. An organic ionic liquid has a molecular structure that exhibits a liquid state in a wide range of temperature including room temperature.

The molecular structure is composed of a cationic component and an anionic component.

Examples of the cationic component include: an imidazole derivative, such as N,N-dimethyl imidazole salt, N,N-methylethyl imidazole salt, and N,N-methylpropyl imidazole salt; an aromatic salt, such as a pyridinium derivative (e.g., N,N-dimethyl pyridinium salt, and N,N-methylpropyl pyridinium salt); and an aliphatic quaternary ammonium-based compound, such as tetraalkyl ammonium (e.g., trimethylpropyl ammonium salt, trimethylhexyl ammonium salt, and triethylhexyl ammonium salt).

The anion component is preferably a fluorine-containing compound in view of stability in the atmosphere, and examples thereof include BF$_4^-$, CF$_3$SO$_3^-$, PF$_4^-$, (CF$_3$SO$_2$)$_2$N$^-$, and B(CN$_4$)$^-$. The ionic liquid formulated with a combination of the aforementioned cation component and the aforementioned anion component can be used.

Examples of the solvent include propylene carbonate, acetonitrile, γ-butyrolactone, ethylene carbonate, sulfolane, dioxolane, tetrahydrofuran, 2-methyltetrahydrofuran, dimethyl sulfoxide, 1,2-dimethoxyethane, 1,2-ethoxymethoxyethane, polyethylene glycol, alcohol, and a mixed solvent of any combination of the aforementioned solvents.

Examples of the curable resin include a typical material, such as a photocurable resin, and a heat-curable resin (e.g., an acrylic resin, a urethane resin, an epoxy resin, a vinyl chloride resin, an ethylene resin, a melamine resin, and a phenol resin). The curable resin is preferably a material having high compatibility to the electrolyte. As for the material having such a structure, preferred is a derivative of ethylene glycol, such as polyethylene glycol, and polypropylene glycol. As for the curable resin, moreover, a photocurable resin is preferably used, because an element can be produced at a low temperature within a short period compared to a method for forming a film through thermal polymerization, or evaporation of the solvent.

The particularly preferable combination is an electrolyte layer composed of a solid solution of a matrix polymer containing an oxyethylene chain or an oxypropylene chain, and an ionic liquid. As the electrolyte layer has the aforementioned structure, both high hardness, and high ion conductivity can be easily achieved.

The inorganic particles are appropriately selected depending on the intended purpose without any limitation, provided that they are a material that can form a porous layer, and can bear the electrolyte and the curable resin. The inorganic particles are preferably a material having high insulating properties, transparency, and durability in view of stability of an electrochromic reaction and visibility. Examples of the inorganic particles include oxide or sulfide of silicon, aluminum, titanium, zinc, and tin, and a mixture thereof.

The size (average particle diameter) of the inorganic particles is appropriately selected depending on the intended purpose without any limitation, and the size thereof is preferably 10 nm to 10 µm, more preferably 10 nm to 100 nm.

<Protective Layer>

The protective layer 17 is formed for the purpose of protecting side surfaces of the electrochromic device physically and chemically. The protective layer 17 can be formed by applying a UV-curable or heat-curable insulating resin to cover side surfaces and/or top surface of the electrochromic device, followed by curing the resin. Moreover, the protective layer is preferably a protective layer, in which a curable resin, and an inorganic material are laminated. Since the protective layer has a laminate structure including the inorganic material, barrier properties to oxygen or water improve.

The inorganic material is preferably a material having high insulating properties, transparency and durability. Specific examples thereof include oxide or sulfide of silicon, aluminum, titanium, zinc, and tin, and a mixture thereof. These films can be easily formed by vacuum film forming processes, such as sputtering, and vapor deposition.

The thickness of the protective layer 17 is appropriately selected depending on the intended purpose without any limitation, but the thickness thereof is preferably 0.5 µm to 10 µm. Moreover, the protective layer may be formed after thermoforming.

<Electrochromic Device of Second Embodiment>

The electrochromic device of the second embodiment is an example of the electrochromic device having a different layer structure to that of the first embodiment. Note that, in the second embodiment, the explanations of the constitutional parts identical to those of the embodiment, which has been already explained, may be omitted.

FIGS. 2A and 2B are cross-sectional views illustrating the electrochromic device of the second embodiment.

With reference to FIGS. 2A and 2B, the electrochromic device 20 of the second embodiment is different from the electrochromic device 10 of the first embodiment (see FIGS. 1A and 1B) in that an antideterioration layer 18 is formed in contact with the electrolyte layer 14 and the second electrode layer 15.

In the second embodiment, the antideterioration layer 18 is formed for the purpose of preventing a deterioration of the second electrode layer 15 caused by electrochemical reactions. As the antideterioration layer is provided, the electrochromic device of the second embodiment can provide an electrochromic device having excellent repeating properties, in addition to the effect obtainable by the first embodiment.

<Antideterioration Layer>

A roll of the antideterioration layer 18 is to carry out a reverse reaction of the electrochromic layer 13 to take a balance of electrical charge, and hence to prevent corrosions or deteriorations of the second electrode layer 15 due to an irreversible oxidation or reduction reaction. As a result, repeating stability of the electrochromic device 20 is improved. Note that, the reverse reaction also includes a function as a capacitor, as well as oxidation and reduction of the antideterioration layer.

The material of the antideterioration layer 18 is appropriately selected depending on the intended purpose without any limitation, provided that it is a material capable of preventing the first electrode layer 12 and the second electrode layer 15 from being corroded as a result of an irreversible oxidation or reduction reaction. As for the material of the antideterioration layer 18, for example, antimony tin oxide, nickel oxide, titanium oxide, zinc oxide, tin oxide, or conductive or semiconductive metal oxide containing any combination of the aforementioned metal oxides. In the case where a tint of the antideterioration layer does not cause a problem, moreover, the same material to the aforementioned electrochromic material can be used.

an electrochromic device is produced as an optical element, which requires transparency, such as a lens, a material having a high transparency is preferably used as the antideterioration layer 18. As for such a material, n-type semiconductive oxide particles (n-type semiconductive metal oxide) are preferably used. Specific examples thereof include titanium oxide, tin oxide, zinc oxide, compound particles containing a plurality of the aforementioned materials, and a mixture thereof, each of which are composed of particles having a primary particle diameter of 100 nm or smaller.

In the case where the antideterioration layer 18 is provided, moreover, the electrochromic layer 13 is preferably composed of a material, which changes the color thereof through an oxidation reaction. As a result, the n-type semiconductive metal oxide is easily reduced (electron injection) at the same time as the oxidation reaction of the electrochromic layer, and thus driving voltage can be reduced.

In the aforementioned embodiment, the particularly preferable electrochromic material is an organic polymer material. Use of the organic polymer material allows easy film formation through a coating process, and enables to adjust or control a color with adjusting a molecular structure thereof. Specific examples of the organic polymer materials include those reported in Chemistry of Materials review 2011. 23, 397-415, Navigating the Color Palette of Solution-Processable Electrochromic Polymers (Reynolds); Macromolecules 1996.29 7629-7630 (Reynolds); and Polymer journal, Vol. 41, No. 7, Electrochromic Organic Metallic Hybrid Polymers.

Examples of such the organic polymer material include a poly(3,4-ethylenedioxythiophene)-based material, and a chain-forming polymer between bis(terpyridine) and iron ion. Moreover, the particularly preferred embodiment include a polymer layer prepared by polymerizing a radical polymerizable compound containing a triaryl amine derivative and triaryl amine. Since this antideterioration layer can perform stable oxidation reduction reactions, durability thereof is improved.

Meanwhile, examples of a material of a p-type semiconductor layer having a high transparency used as the antideterioration layer 18 include an organic material containing nitroxyl radicals (NO radicals), such as a derivative of 2,2,6,6-tetramethylpiperidine-N-oxyl (TEMPO), and a polymer material of the derivative.

Note that, the antideterioration layer 18 is not particularly limited. A deterioration preventing function may be imparted to the electrolyte layer 14 by mixing a material for the antideterioration layer in the electrolyte layer 14. In this case, the layer structure is the same as the layer structure of the electrochromic device 10 of the first embodiment illustrated in FIGS. 1A and 1B.

The formation method of the antideterioration layer 18 is appropriately selected depending on the intended purpose without any limitation, and examples thereof include vacuum vapor deposition, sputtering, and ion plating. In the case where a material of the antideterioration layer 18 can be applied by coating to form a film, examples of the production method thereof include spin coating, casting, microgravure coating, gravure coating, bar coating, roller coating, wire-bar coating, dip coating, slit coating, capillary coating, spray coating, nozzle coating, and various printing methods, such as gravure printing, screen printing, flexographic printing, offset printing, reverse printing, and inkjet printing.

<Electrochromic Device of Third Embodiment>

The electrochromic device of the third embodiment is an example of the electrochromic device, which has a layer structure different from that of the second embodiment. Note that, in the third embodiment, the explanations of the constitutional parts identical to those of the embodiments, which has been already explained, may be omitted.

FIGS. 3A and 3B are cross-sectional views each illustrating the electrochromic device 30 of the third embodiment. With reference to FIGS. 3A and 3B, the electrochromic device 30 of the third embodiment is different from the electrochromic device 20 (see FIGS. 2A and 2B) of the second embodiment in that the second support 16 is omitted, and a protective layer 17 is formed on the second electrode layer 15.

As for the protective layer 17 formed on the second electrode layer 15, any of the materials listed for the protective layer 17 formed at the side surfaces can be used. However, the material of the protective layer 17 formed on the second electrode layer 15 may be identical to or different from the material of the protective layer 17 formed at the side surfaces. Since the electrochromic device 30 of the third embodiment is formed with one support, low cost production can be realized as well as reduction in the thickness.

<Electrochromic Device of Fourth Embodiment>

The electrochromic device of the fourth embodiment is an example of the electrochromic device, which has a layer structure different from that of the third embodiment. Note that, in the fourth embodiment, the explanations of the constitutional parts identical to those of the embodiments, which has been already explained, may be omitted.

FIGS. 4A and 4B are cross-sectional views illustrating the electrochromic device 40 of the fourth embodiment. With reference to FIGS. 4A and 4B, the electrochromic device 40 of the fourth embodiment is different from the electrochromic device 30 (see FIGS. 3A and 3B) of the third embodiment in that the positions of the electrochromic layer 13 and the antideterioration layer 18 are reversed.

Although the positions of the layers are different in the electrochromic device 40 of the fourth embodiment, the electrochromic layer 13 gives out and receives electrical charges as voltage is applied between the first electrode layer 12 and the second electrode layer 15. As a result, oxidation and reduction reactions are caused to color and discharge the electrochromic device 40.

<Electrochromic Device of Fifth Embodiment>

The fifth embodiment is an example of the electrochromic device, in which the second support 16 is thickened by forming a resin layer on the outer surface of the second support 16 of the electrochromic device 10 of the first embodiment illustrated in FIG. 1B. Note that, in the fifth embodiment, the explanations of the constitutional parts identical to those of the embodiments, which has been already explained, may be omitted.

FIG. 5 is a cross-sectional view illustrating the electrochromic device of the fifth embodiment. With reference to FIG. 5, the second support 16 is thickened. As the second support 16 is thickened, it is possible to perform cutting on the outer surface of the second support 16 to thereby form a desired curve. Therefore, lens processing (e.g., power adjustment) according to the conditions unique to a user can be realized. Specifically, it is not necessary to prepare molds or members depending on a shape of a product, and thus small production of various types of products can be performed easily.

Although it is illustrated in the drawing, it is also possible to form a resin layer on the outer surface of the first support 11 to thicken the first support 11.

Examples of a method for forming a resin layer for thickening include a method where a sheet-shaped electrochromic device after thermoforming is set in a desired mold, and a resin material identical to the support, or having the smaller refractive index is applied by injection molding, or cast molding.

(Electrochromic Dimming Device)

The electrochromic dimming device of the present invention includes the electrochromic device of the present invention, and may further contain other members, if necessary.

For example, the electrochromic dimming device is suitably used for electrochromic dimming spectacles, an antiglare mirror, and a dimming glass. Among them, electrochromic dimming spectacles are preferable.

The aforementioned other members are appropriately selected depending on the intended use without any limitation.

Examples thereof include a spectacle frame, a power source, and a switch.

FIG. 6 is a perspective view illustrating the electrochromic dimming spectacles including the electrochromic dimming device of the present invention. With reference to FIG. 6, the electrochromic dimming spectacles 150 contains the electrochromic dimming devices 51, a spectacle frame 52, a switch 53, and a power source 54. The electrochromic dimming device 51 is the electrochromic dimming device of the present invention, which is processed into a desired shape.

Two electrochromic dimming devices 51 are incorporated into a spectacle frame 52. To the spectacle frame 52, a switch 53 and a power source 54 are provided. The power source 54 is electrically connected to the first electrode and the second electrode with wirings, which are not illustrated, via the switch 53.

For example, one state can be selected from the state where positive voltage is applied between the first electrode and the second electrode, the state where negative electrode is applied, and the state where no voltage is applied, by switching with the switch 53.

As for the switch 53, for example, an appropriate switch, such as a sliding switch, and a push switch, can be used. However, the switch 53 is a switch capable of switching between at least the aforementioned three states.

As for the power source 54, for example, an appropriate DC power supply, such as a bottom battery, and a solar battery, can be used. The power source 54 is capable of applying voltage (several voltages in positive and negative) between the first electrode and the second electrode.

For example, the two electrochromic dimming devices 51 are colored in the predetermined color by applying positive voltage between the first electrode and the second electrode.

Moreover, the two electrochromic dimming devices 51 are discharged to become transparent by applying negative voltage between the first electrode and the second electrode.

Depending on the characteristics of the material used for the electrochromic layer, however, there is a case where the electrochromic dimming device is colored by applying negative voltage between the first electrode and the second electrode, and the electrochromic dimming device is discharged to become transparent by applying positive voltage between the first electrode and the second electrode. Note that, once the electrochromic dimming device is colored, the color remained without applying the voltage between the first electrode and the second electrode.

EXAMPLES

The present invention is explained through examples thereinafter, but the present invention is not limited to these examples.

Example 1

<Production of Electrochromic Device>

Example 1 is an example where the electrochromic device 20 illustrated in FIGS. 2A and 2B is produced. Note that, the electrochromic device 20 produced in Example 1 can be also used as a dimming lens device.

«Formation of First Electrode Layer and Electrochromic Layer»

First, an oval polycarbonate substrate in the size of 80 mm (the maximum length of the major length)×55 mm (the maximum length of the minor length), and the thickness of 0.5 mm was provided as a first support 11.

An ITO film in the thickness of about 100 nm was formed on the first support by sputtering as a first electrode layer 12.

Next, a titanium oxide nanoparticle dispersion liquid (product name: SP210, manufactured by Showa Titanium Co., Ltd., the average particle diameter: 20 nm) was applied on a surface of the ITO film by spin coating, followed by performing annealing for 15 minutes at 120° C., to thereby form a nano-structure semiconductor material composed of a titanium oxide particle film having a thickness of about 1.0 µm.

Subsequently, a 2,2,3,3-tetrafluoropropanol solution containing 1.5% by mass of the electrochromic compound represented by the following structural formula A was applied by spin coating, followed by performing annealing for 10 minutes at 120° C. to bear (adsorb) the electrochromic compound on the titanium oxide particle film, to thereby form an electrochromic layer 13.

Subsequently, a SiO$_2$ particle (the average primary particle diameter: 20 nm) dispersion liquid (silica solid content:

24.8% by mass, polyvinyl alcohol: 1.2% by mass, and water: 74% by mass) was applied on the electrochromic layer 13 by spin coating, to thereby form an insulating inorganic particle layer having a thickness of 2 µm.

«Formation of Second Electrode Layer and Antideterioration Layer»

A polycarbonate substrate in the same shape and the same thickness to those of the first support 11 was provided as a second support 16.

An ITO film in the thickness of about 100 nm was formed on the second support by sputtering as a second electrode layer 15. Subsequently, an ATO particle dispersion liquid [ATO average particle diameter: 20 nm, a dispersion liquid prepared by adding 6% by mass of a urethane binder (HW140SF, manufactured by DIC Corporation) to a 6% by mass 2,2,3,3-tetrafluoropropanol solution] was applied onto a surface of the ITO film by spin coating, followed by performing annealing for 15 minutes at 120° C., to thereby form an antideterioration layer 18 composed of an ATO particle film having a thickness of about 1.0 µm.

Subsequently, a solution prepared by mixing polyethylene diacrylate (PEG400DA, manufactured by Nippon Kayaku Co., Ltd.), a photopolymerization initiator (IRG184, manufactured by BASF), and an electrolyte (1-ethyl-3-methylimidazolium salt) at a mass ratio of 100/5/40 was applied on a surface of the insulating inorganic particle layer above the first support 11, and was bonded to a side of the antideterioration layer 18 of the second support 16. Ultraviolet (UV) rays were applied to the resultant to cure, to thereby form an electrolyte layer 14.

«Formation of Protective Layer»

Subsequently, an ultraviolet ray-curable adhesive (product name: KARAYAD R604, manufactured by Nippon Kayaku Co., Ltd.) was dripped on side surfaces of the bonded laminated body, followed by applying ultraviolet rays to cure, to thereby form a protective layer 17 in the thickness of 3 µm.

In the manner as described above, the electrochromic device 20 before thermoforming, illustrated in FIG. 2A, was produced.

«Three Dimensional (3D) Thermoforming»

The produced electrochromic device was nipped with a concave mold and a convex mold, each having the curvature radius of about 130 mm, with heating at 135° C., to thereby produce an electrochromic device 20 of Example 1 having a three-dimensional (3D) spherical surface.

After the thermoforming, the maximum length of the major length of the support at the curved surface of the electrochromic device was 81 mm. After the thermoforming, (Chem. 2)

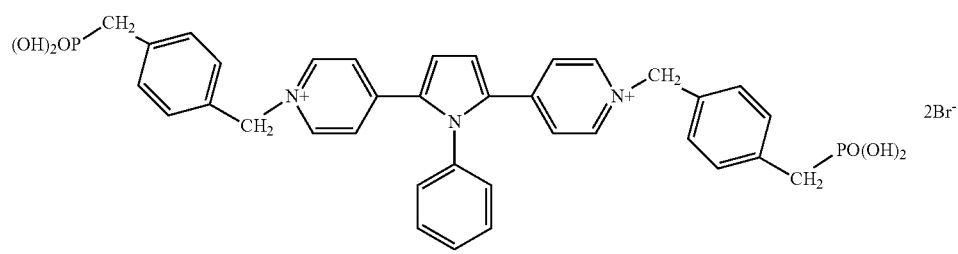

<Structural Formula A> the maximum length of the major length of the support at the curved surface of the electrochromic device was (81 mm/80 mm)×100=101.3%, relative to the maximum length of the major length of the support at the flat surface of the electrochromic device before the thermoforming.

«Coloring and Discharging»

Coloring and discharging of the produced electrochromic device 20 was confirmed. Specifically, part of the edge portion of the first support 11 and part of the edge portion of the second support 16 were peeled to form a contact portion of the first electrode layer 12 and a contact portion of the second electrode layer 15. Voltage of −3.5 V was applied between the first electrode layer 12 and the second electrode layer 15 for 3 seconds so that the first electrode layer was to be a negative electrode. As a result, coloring of the electrochromic device 20 in magenta originated from the electrochromic compound represented by the structural formula A was confirmed.

Moreover, voltage of +3.5 V was applied between the drawing parts of the first electrode layer 12 and the second electrode layer 15 for 2 seconds. As a result, it was confirmed that the electrochromic compound was discharged, and the electrochromic device became clear.

Example 2

<Production of Electrochromic Device>

An electrochromic device before thermoforming was produced in the same manner as in Example 1, provided that a first laminate electrode layer 12 was formed by forming a lattice network electrode having 70 μm-lines, 4 mm-pitches, and 5 μm-thickness on the first support 11 through a printing method using an Ag nano particle ink, followed by forming an ITO film having a thickness of 50 nm on the network electrode through sputtering. The produced electrochromic device was nipped with a concave mold and a convex mold, each having the curvature radius of about 130 mm, with heating at 135° C., to thereby produce an electrochromic device 20 of Example 2 having a 3D spherical surface.

After the thermoforming, the maximum length of the major length of the support at the curved surface of the electrochromic device was 81 mm. After the thermoforming, the maximum length of the major length of the support at the curved surface of the electrochromic device was (81 mm/80 mm)×100=101.3%, relative to the maximum length of the major length of the support at the flat surface of the electrochromic device before the thermoforming.

«Coloring and Discharging»

Coloring and discharging of the produced electrochromic device 20 of Example 2 was confirmed. Specifically, part of the edge portion of the first support 11 and part of the edge portion of the second support 16 were peeled to form a contact portion of the first electrode layer 12 and a contact portion of the second electrode layer 15. Voltage of −3.5 V was applied between the first electrode layer 12 and the second electrode layer 15 for 2.5 seconds so that the first electrode layer was to be a negative electrode. As a result, coloring of the electrochromic device 20 in magenta originated from the electrochromic compound represented by the structural formula A was confirmed. Moreover, voltage of +3.5 V was applied between the drawing parts of the first electrode layer 12 and the second electrode layer 15 for 2.5 seconds. As a result, it was confirmed that the electrochromic compound was discharged, and the electrochromic device became clear.

Example 3

<Production of Electrochromic Device>

An electrochromic device before thermoforming was produced in the same manner as in Example 2, provided that a first laminate electrode layer 12 having a thickness of about 400 nm was formed by forming an ITO film having a thickness of about 50 nm through sputtering, followed by applying an aqueous dispersion liquid of carbon nanotubes through spin coating.

The produced electrochromic device was nipped with a concave mold and a convex mold, each having the curvature radius of about 90 mm, with heating at 135° C., to thereby produce an electrochromic device 20 of Example 3 having a three-dimensional (3D) spherical surface.

After the thermoforming, the maximum length of the major length of the support at the curved surface of the electrochromic device was 81 mm. After the thermoforming, the maximum length of the major length of the support at the curved surface of the electrochromic device was (81 mm/80 mm)×100=101.3%, relative to the maximum length of the major length of the support at the flat surface of the electrochromic device before the thermoforming.

«Coloring and Discharging»

Coloring and discharging of the produced electrochromic device 20 of Example 3 was confirmed. Specifically, part of the edge portion of the first support 11 and part of the edge portion of the second support 16 were peeled to form a contact portion of the first electrode layer 12 and a contact portion of the second electrode layer 15. Voltage of −3.5 V was applied between the first electrode layer 12 and the second electrode layer 15 for 2.5 seconds so that the first electrode layer was to be a negative electrode. As a result, coloring of the electrochromic device 20 in magenta originated from the electrochromic compound represented by the structural formula A was confirmed. Moreover, voltage of +3.5 V was applied between the drawing parts of the first electrode layer 12 and the second electrode layer 15 for 2.5 seconds. As a result, it was confirmed that the electrochromic compound was discharged, and the electrochromic device became clear.

Example 4

An electrochromic device 20 before thermoforming was produced in the same manner as in Example 2, provided that only a lattice network electrode having 70 μm-lines, 2 mm-pitches, and 5 μm-thickness was formed on the first support 11 through a printing method using an Ag ink.

The produced electrochromic device was nipped with a concave mold and a convex mold, each having the curvature radius of about 90 mm, with heating at 135° C., to thereby produce an electrochromic device 20 of Example 4 having a three-dimensional (3D) spherical surface.

After the thermoforming, the maximum length of the major length of the support at the curved surface of the electrochromic device was 96 mm. After the thermoforming, the maximum length of the major length of the support at the curved surface of the electrochromic device was (96 mm/80 mm)×100=120%, relative to the maximum length of the major length of the support at the flat surface of the electrochromic device before the thermoforming.

«Coloring and Discharging»

Coloring and discharging of the produced electrochromic device 20 of Example 4 was confirmed. Specifically, part of the edge portion of the first support 11 and part of the edge portion of the second support 16 were peeled to form a contact portion of the first electrode layer 12 and a contact portion of the second electrode layer 15. Voltage of −3.5 V was applied between the first electrode layer 12 and the second electrode layer 15 for 3 seconds so that the first electrode layer was to be a negative electrode. As a result, coloring of the electrochromic device 20 in magenta originated from the electrochromic compound represented by the structural formula A was confirmed. Moreover, voltage of +3.5 V was applied between the drawing parts of the first electrode layer 12 and the second electrode layer 15 for 3 seconds. As a result, it was confirmed that the electrochromic compound was discharged, and the electrochromic device became clear.

Example 5

<Production of Electrochromic Device>

An electrochromic device 20 was produced in the same manner as in Example 1, provided that a solution prepared by mixing polyethylene diacrylate, a photopolymerization initiator (IRG184, manufactured by BASF), the compound represented by the following structural formula B, and 2-butanone at a mass ratio of 20/1/20/400 was applied onto the surface of the second electrode layer 15, followed by applying ultraviolet rays in the nitrogen atmosphere to cure, to thereby form an oxidation-reactive antideterioration layer 18.

(Chem. 3)

<Structural Formula B>

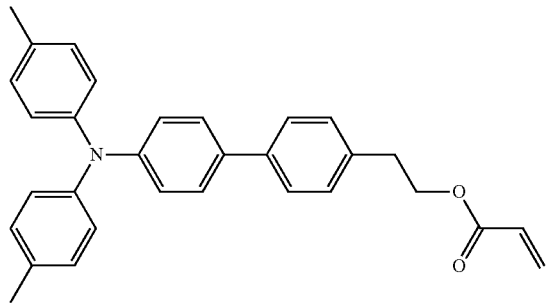

The produced electrochromic device was nipped with a concave mold and a convex mold, each having the curvature radius of about 130 mm, with heating at 135° C., to thereby produce an electrochromic device 20 of Example 5 having a three-dimensional (3D) spherical surface.

After the thermoforming, the maximum length of the major length of the support at the curved surface of the electrochromic device was 81 mm. After the thermoforming, the maximum length of the major length of the support at the curved surface of the electrochromic device was (81 mm/80 mm)×100=101.3%, relative to the maximum length of the major length of the support at the flat surface of the electrochromic device before the thermoforming.

«Coloring and Discharging»

Coloring and discharging of the produced electrochromic device 20 of Example 5 was confirmed. Specifically, part of the edge portion of the first support 11 and part of the edge portion of the second support 16 were peeled to form a contact portion of the first electrode layer 12 and a contact portion of the second electrode layer 15. Voltage of −3.0 V was applied between the first electrode layer 12 and the second electrode layer 15 for 3 seconds so that the first electrode layer was to be a negative electrode. As a result, mixed-color coloring of the electrochromic device 20, in which magenta originated from the electrochromic compound represented by the structural formula A, and blue originated from the electrochromic compound (antideterioration layer) represented by the structural formula B were mixed, was confirmed.

Moreover, voltage of +3.0 V was applied between the drawing parts of the first electrode layer 12 and the second electrode layer 15 for 3 seconds. As a result, it was confirmed that the electrochromic compound was discharged, and the electrochromic device became clear.

Example 6

<Production of Electrochromic Device>

An electrochromic device 20 before thermoforming was produced in the same manner as in Example 5, provided that a first electrode layer 12 and a second electrode layer 15 were each formed by sputtering to have a three-layer structure of ITO/AgPdCu(98/1/1)/ITO in the film thicknesses of 10 nm/5 nm/10 nm, respectively.

The produced electrochromic device was nipped with a concave mold and a convex mold, each having the curvature radius of about 90 mm, with heating at 135° C., to thereby produce an electrochromic device 20 of Example 6 having a three-dimensional (3D) spherical surface.

After the thermoforming, the maximum length of the major length of the support at the curved surface of the electrochromic device was 81 mm. After the thermoforming, the maximum length of the major length of the support at the curved surface of the electrochromic device was (81 mm/80 mm)×100=101.3%, relative to the maximum length of the major length of the support at the flat surface of the electrochromic device before the thermoforming.

«Coloring and Discharging»

Coloring and discharging of the produced electrochromic device 20 of Example 6 was confirmed. Specifically, part of the edge portion of the first support 11 and part of the edge portion of the second support 16 were peeled to form a contact portion of the first electrode layer 12 and a contact portion of the second electrode layer 15. Voltage of −3.0 V was applied between the first electrode layer 12 and the second electrode layer 15 for 2.5 seconds so that the first electrode layer was to be a negative electrode. As a result, mixed-color coloring of the electrochromic device 20, in which magenta originated from the electrochromic compound represented by the structural formula A, and blue originated from the electrochromic compound (antideterioration layer) represented by the structural formula B were mixed, was confirmed.

Moreover, voltage of +3.0 V was applied between the drawing parts of the first electrode layer 12 and the second electrode layer 15 for 2.5 seconds. As a result, it was confirmed that the electrochromic compound was discharged, and the electrochromic device became clear.

Example 7

<Production of Electrochromic Device>

Example 7 is an example where the electrochromic device 30 illustrated in FIGS. 3A and 3B, from which the antideterioration layer 18 is omitted, is produced. Note that, the electrochromic device 30 produced in Example 7 can be also used as a dimming lens device.

«Formation of First Electrode Layer and Electrochromic Layer»

First, an oval polycarbonate substrate in the size of 80 mm (the maximum length of the major length)×55 mm (the maximum length of the minor length), and the thickness of 0.5 mm was provided as a first support 11.

An ITO film in the thickness of about 100 nm was formed on the first support by sputtering as a first electrode layer 12.

Next, a titanium oxide nanoparticle dispersion liquid (product name: SP210, manufactured by Showa Titanium Co., Ltd., the average particle diameter: 20 nm) was applied on a surface of the ITO film by spin coating, followed by performing annealing for 15 minutes at 120° C., to thereby form a nano-structure semiconductor material composed of a titanium oxide particle film having a thickness of about 1.0 µm.

Subsequently, a 2,2,3,3-tetrafluoropropanol solution containing 1.5% by mass of the electrochromic compound represented by the following structural formula A was applied by spin coating, followed by performing annealing for 10 minutes at 120° C. to bear (adsorb) the electrochromic compound on the titanium oxide particle film, to thereby form an electrochromic layer 13.

(Chem. 4)

<Structural Formula A>

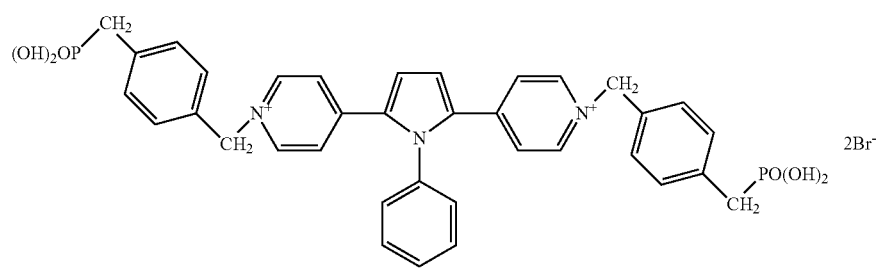

Subsequently, a $SiO_2$ particle (the average primary particle diameter: 20 nm) dispersion liquid (silica solid content: 24.8% by mass, polyvinyl alcohol: 1.2% by mass, and water: 74% by mass) was applied on the electrochromic layer 13 by spin coating, to thereby form an insulating inorganic particle layer having a thickness of 2 µm.

Subsequently, a solution prepared by mixing polyethylene diacrylate (PEG400DA, manufactured by Nippon Kayaku Co., Ltd.), a photopolymerization initiator (IRG184, manufactured by BASF), and an electrolyte (1-ethyl-3-methylimidazolium salt) at a mass ratio of 100/5/40 was applied on a surface of the insulating inorganic particle layer, followed by applying ultraviolet rays to cure, to thereby form a solid electrolyte layer 14.

Moreover, an ITO film having a thickness of about 100 nm was formed on the surface of the solid electrolyte layer 14 by sputtering, to thereby form a second electrode layer 15.

«Formation of Protective Layer»

Subsequently, an ultraviolet ray-curable adhesive (product name: KARAYAD R604, manufactured by Nippon Kayaku Co., Ltd.) was applied on the second electrode layer 15 by spin coating, followed by applying ultraviolet rays to cure the adhesive, to thereby form a protective layer 17 in the thickness of 3 µm.

In the manner as described above, the electrochromic device 30 before thermoforming illustrated in FIG. 3A, from which the antideterioration layer 18 was omitted, was produced.

«Three Dimensional (3D) Thermoforming»

The produced electrochromic device was nipped with a concave mold and a convex mold, each having the curvature radius of about 130 mm, with heating at 135° C., to thereby produce an electrochromic device 30 of Example 7 having a three-dimensional (3D) spherical shape.

After the thermoforming, the maximum length of the major length of the support at the curved surface of the electrochromic device was 81 mm. After the thermoforming, the maximum length of the major length of the support at the curved surface of the electrochromic device was (81 mm/80 mm)×100=101.3%, relative to the maximum length of the major length of the support at the flat surface of the electrochromic device before the thermoforming.

«Coloring and Discharging»

Coloring and discharging of the produced electrochromic device 30 of Example 7 was confirmed. Specifically, part of the edge portion of the first support 11 was peeled to form a contact portion of the first electrode layer 12 and a contact portion of the second electrode layer 15. Voltage of −3.5 V was applied between the first electrode layer 12 and the second electrode layer 15 for 3.5 seconds so that the first electrode layer was to be a negative electrode. As a result, coloring of the electrochromic device 30 in magenta originated from the electrochromic compound represented by the structural formula A was confirmed.

Moreover, voltage of +3.5 V was applied between the drawing parts of the first electrode layer 12 and the second electrode layer 15 for 3.5 seconds. As a result, it was confirmed that the electrochromic compound was discharged, and the electrochromic device became clear.

Example 8

<Production of Electrochromic Dimming Device>

The 3D electrochromic sheet after the thermoforming, which had been produced in Example 5, was cut according to a shape of a frame. The cut pieces were then incorporated into the spectacle frame, to thereby produce an electrochromic dimming spectacles, as illustrated in FIG. 6. Note that, a power source for driving, signal-control circuits, a switch, and wirings were mounted in the spectacle frame.

«Coloring and Discharging»

Coloring and discharging of the produced electrochromic dimming spectacles were confirmed. Specifically, the switch for coloring was turned on, and voltage of −3 V was applied between the drawing parts of the first electrode and the second electrode for 3 seconds. As a result, it was confirmed that the area where the first electrode and the second electrode were overlapped was colored in a mixed color including magenta originated from the electrochromic compound represented by the structural formula A, and the electrochromic compound (antideterioration layer) represented by the structural formula B.

Subsequently, the switch for discharging was turned on, and voltage of +3 V was applied between the drawing parts of the first electrode and the second electrode for 3 seconds. As a result, it was confirmed that the area where the first electrode and the second electrode were overlapped was discharged, and became transparent.

The preferred embodiments and examples have been specifically explained above, but the present invention is not limited to the aforementioned embodiments and examples, and various modifications and substitutions can be applied to the aforementioned embodiments and examples without departed from the scope specified with the claims of the invention. For example, the aforementioned embodiments can be appropriately combined.

For example, the embodiments of the present invention are as follows:

<1> An electrochromic device, including:
a laminated body, which includes:
  at least one support;
  a first electrode layer on the at least one support;
  an electrochromic layer on the first electrode layer;
  a second electrode layer disposed to face the first electrode layer; and
  an electrolyte layer, which fills between the first electrode layer and the second electrode layer, and is on the electrochromic layer,
  the at least one support including a resin substrate, and the laminated body having a desired curve formed by thermoforming.

<2> The electrochromic device according to <1>, wherein a maximum length of a major length of the at least one support on the curve of the laminated body after the thermoforming is 120% or less relative to a maximum length of a major length of the support on a flat surface of the laminated body before the thermoforming.

<3> The electrochromic device according to <1> or <2>, wherein a maximum length of a major length of the at least one support on the curve of the laminated body after the thermoforming is 103% or less relative to a maximum length of a major length of the support on a flat surface of the laminated body before the thermoforming.

<4> The electrochromic device according to any one of <1> to <3>, wherein at least one of the first electrode layer and the second electrode layer contains conductive metal, conductive oxide, conductive carbon, or any combination thereof.

<5> The electrochromic device according to any one of <1> to <4>, wherein at least one of the first electrode layer and the second electrode layer has a laminate structure including a layer containing conductive metal or conductive carbon, and a conductive oxide layer.

<6> The electrochromic device according to any one of <1> to <5>, further including an antideterioration layer in contact with the second electrode layer, wherein the antideterioration layer is configured to carry out a reverse electrochemical reaction to an oxidation reduction reaction of the electrochromic layer.

<7> The electrochromic device according to any one of <1> to <6>, wherein the electrolyte layer is a solid electrolyte layer, and the solid electrolyte layer contains a solid solution of a matrix polymer containing an oxyalkylene chain, and an ionic liquid.

<8> A method for producing the electrochromic device according to any one of <1> to <7>, the method including:
  thermoforming a laminated body to have a desired curve.

<9> The method according to <8>, further including:
  forming the first electrode layer on the support;
  forming the electrochromic layer on the first electrode layer;
  forming a solid electrolyte layer on the electrochromic layer;
  forming the second electrode layer on the solid electrolyte layer; and
  forming a protective layer on the second electrode layer to form the laminated body.

<10> The method according to <8>, further including:
  forming the first electrode layer on a first support, and forming the electrochromic layer on the first electrode layer to produce a first member;
  forming the second electrode layer on a second support to produce a second member; and
  bonding the first member and the second member together with the electrolyte layer being between the first member and the second member, to form the laminated body.

<11> The method according to <9> or <10>, further including: forming a resin layer on an outer surface of the at least one support to thicken the support, and cutting the support thickened to form a desired curve.

<12> An electrochromic dimming device, including: the electrochromic device according to any one of <1> to <7>.

The electrochromic device according to any one of <1> to <7>, the method for producing electrochromic device according to any one of <8> to <11>, and the electrochromic dimming device according to <12> solve the aforementioned various problems in the art, and achieve the following object. Specifically, the object of the electrochromic device, the method for producing an electrochromic device, and the electrochromic dimming device is to provide an electrochromic device, which has a desired curve formed by thermoforming, and is suitably used for optical use, such as a lens.

REFERENCE SIGNS LIST

10: electrochromic device
11: first support
12: first electrode layer
13: electrochromic layer
14: electrolyte layer
15: second electrode layer
16: second support
17: protective layer
18: antideterioration layer
20: electrochromic device
30: electrochromic device
40: electrochromic device
50: electrochromic device
51: electrochromic dimming device
150: electrochromic dimming spectacles

The invention claimed is:

1. An electrochromic device, comprising:
a laminated body, which comprises:
at least one support;
a first electrode layer on the at least one support;
an electrochromic layer on the first electrode layer;
a second electrode layer disposed to face the first electrode layer; and
an electrolyte layer, which fills between the first electrode layer and the second electrode layer, and is on the electrochromic layer,
the at least one support comprising a resin substrate, and the laminated body including the resin substrate having a desired curve formed by thermoforming, and wherein a maximum length of a major length of the at least one support on the curve of the laminated body after the thermoforming is 120% or less relative to a maximum length of a major length of the support on a flat surface of the laminated body before the thermoforming.

2. The electrochromic device according to claim 1, wherein the maximum length of the major length of the support on the curve of the laminated body after the thermoforming is 103% or less relative to a maximum length of the major length of the support on the flat surface of the laminated body before the thermoforming.

3. The electrochromic device according to claim 1, wherein at least one of the first electrode layer and the second electrode layer contains conductive metal, conductive oxide, conductive carbon, or any combination thereof.

4. The electrochromic device according to claim 1, wherein at least one of the first electrode layer and the second electrode layer has a laminate structure including a layer containing conductive metal or conductive carbon, and a conductive oxide layer.

5. The electrochromic device according to claim 1, further comprising an antideterioration layer in contact with the second electrode layer, wherein the antideterioration layer is configured to carry out a reverse electrochemical reaction to an oxidation reduction reaction of the electrochromic layer.

6. A method for producing the electrochromic device of claim 1, the method comprising:
performing the thermoforming of the laminated body to cause the laminated body to have the desired curve,
wherein prior to performing the thermoforming, the method includes:
forming the first electrode layer on the at least one support;
forming the electrochromic layer on the first electrode layer;
forming a solid electrolyte layer as the electrolyte layer, on the electrochromic layer;
forming the second electrode layer on the solid electrolyte layer; and
forming a protective layer on the second electrode layer to form the laminated body.

7. A method for producing the electrochromic device of claim 1, the method comprising:
performing the thermoforming of the laminated body to cause the laminated body to have the desired curve,
wherein said at least one support includes a first support and a second support, and the method further comprises, prior to performing the thermoforming:
forming the first electrode layer on the first support, and forming the electrochromic layer on the first electrode layer to produce a first member;
forming the second electrode layer on the second support to produce a second member; and
bonding the first member and the second member together with the electrolyte layer being between the first member and the second member, to form the laminated body.

8. A method for producing the electrochromic device of claim 1, the method comprising:
performing the thermoforming of the laminated body to cause the laminated body to have the desired curve,
the method further comprising, prior to or after performing the thermoforming:
forming an additional resin layer on an outer surface of the at least one support comprising the resin substrate to thicken the support, and cutting the thickened support to form a desired curve.

9. A method for producing the electrochromic device of claim 1, the method comprising:
performing the thermoforming of the laminated body to cause the laminated body to have the desired curve,
wherein the laminated body having the desired curve is thermoformed with a concave mold and a convex mold.

10. An electrochromic device, comprising:
a laminated body, which comprises:
at least one support;
a first electrode layer on the at least one support;
an electrochromic layer on the first electrode layer;
a second electrode layer disposed to face the first electrode layer; and
an electrolyte layer, which fills between the first electrode layer and the second electrode layer, and is on the electrochromic layer,
the at least one support comprising a resin substrate, and the laminated body having a desired curve formed by thermoforming,
wherein the electrolyte layer is a solid electrolyte layer, and the solid electrolyte layer contains a solid solution of a matrix polymer containing an oxyalkylene chain, and an ionic liquid.

11. The electrochromic dimming device according to claim 10, wherein at least one of the first electrode layer and the second electrode layer contains conductive metal, conductive oxide, conductive carbon, or any combination thereof.

12. The electrochromic dimming device according to claim 10, wherein at least one of the first electrode layer and the second electrode layer has a laminate structure including a layer containing conductive metal or conductive carbon, and a conductive oxide layer.

13. A method for producing the electrochromic device of claim 10, the method comprising:
forming the first electrode layer on the at least one support;
forming the electrochromic layer on the first electrode layer;
forming a solid electrolyte layer as the electrolyte layer, on the electrochromic layer;
forming the second electrode layer on the solid electrolyte layer;
forming a protective layer on the second electrode layer to form the laminated body; and
performing the thermoforming of the laminated body to cause the laminated body to have the desired curve.

14. A method for producing the electrochromic device of claim 10, wherein said at least one support includes a first support and a second support, the method comprising:
forming the first electrode layer on the first support, and forming the electrochromic layer on the first electrode layer to produce a first member;
forming the second electrode layer on the second support to produce a second member; and
bonding the first member and the second member together with the electrolyte layer being between the first member and the second member, to form the laminated body; and
performing the thermoforming of the laminated body to cause the laminated body to have the desired curve.

15. The electrochromic device according to claim 10, further comprising an antideterioration layer in contact with the second electrode layer, wherein the antideterioration layer is configured to carry out a reverse electrochemical reaction to an oxidation reduction reaction of the electrochromic layer.

16. A method for producing the electrochromic device of claim 10, the method comprising:

performing the thermoforming of the laminated body to cause the laminated body to have the desired curve.

17. A method for producing the electrochromic device of claim 10, the method comprising:

performing the thermoforming of the laminated body to cause the laminated body to have the desired curve, the method further comprising, prior to or after performing the thermoforming:

forming an additional resin layer on an outer surface of the at least one support comprising the resin substrate to thicken the support, and cutting the thickened support to form a desired curve.

18. A method for producing the electrochromic device of claim 10, the method comprising:

performing the thermoforming of the laminated body to cause the laminated body to have the desired curve, wherein the laminated body having the desired curve is thermoformed with a concave mold and a convex mold.

19. An electrochromic dimming device, comprising:

an electrochromic device, wherein the electrochromic device comprises:

a laminated body, which comprises:

at least one support;

a first electrode layer on the at least one support;

an electrochromic layer on the first electrode layer;

a second electrode layer disposed to face the first electrode layer; and an electrolyte layer, which fills between the first electrode layer and the second electrode layer, and is on the electrochromic layer, the at least one support comprising a resin substrate, and the laminated body having a desired curve formed by thermoforming, wherein each of the first electrode layer and the second electrode layer has a laminate structure including a layer containing conductive metal or conductive carbon, and a conductive oxide layer.

20. The electrochromic dimming device according to claim 19, further comprising an antideterioration layer in contact with the second electrode layer, wherein the antideterioration layer is configured to carry out a reverse electrochemical reaction to an oxidation reduction reaction of the electrochromic layer.

* * * * *